United States Patent
Chu et al.

(10) Patent No.: US 7,037,978 B2
(45) Date of Patent: *May 2, 2006

(54) QUASI-INTERPENETRATING NETWORKS USED AS SEPARATION MEDIA

(75) Inventors: Benjamin Chu, Setauket, NY (US); Liguo Song, Williamsville, NY (US); Dufei Fang, Painted Post, NY (US); Dehai Liang, Stony Brook, NY (US); Tianbo Liu, Coram, NY (US); Yanmei Wang, Hefei (CN); Qicong Ying, East Setauket, NY (US)

(73) Assignee: The Research Foundation of SUNY at Stony Brook, Stony Brook, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/671,335

(22) Filed: Sep. 25, 2003

(65) Prior Publication Data

US 2005/0070668 A1  Mar. 31, 2005

(51) Int. Cl.
*C08L 9/02* (2006.01)
*C08L 33/20* (2006.01)

(52) U.S. Cl. ............... 525/218; 525/230; 525/234; 525/329.4; 524/458

(58) Field of Classification Search ............... 525/218, 525/329.4, 230, 234; 524/458
See application file for complete search history.

(56) References Cited

U.S. PATENT DOCUMENTS 6,706,162 B1 * 3/2004 Voss et al. ............... 204/455
6,770,698 B1 * 8/2004 Chu et al. ............... 524/458

* cited by examiner

*Primary Examiner*—James J. Seidleck
*Assistant Examiner*—Olga Asionovsky
(74) *Attorney, Agent, or Firm*—Hoffmann & Baron, LLP

(57) ABSTRACT

The invention relates to a quasi-interpenetrating network of polymer chains, the chains comprising linear polyacrylamide (LPA) chains in the form of a main frame having a weight average molecular weight of approximately 0.05 million to approximately 25 million g/mole, and a radius of gyration of approximately 10 nm to 350 nm; and polydimethylacrylamide (PDMA) chains prepared by polymerizing PDMA in the presence of the LPA main frame, wherein the LPA and PDMA chains are entangled within one another and interpenetrate one another, and wherein the quasi-interpenetrating network has substantially no chemical cross-linking.

52 Claims, 27 Drawing Sheets 020604-2.0%; DNA: pGEM-3Zf(+) from the -21 M13 forward primer;
Capillary: 34/42cm; Injection: 75V/cm, 8s;
Run: 225 V/cm; Buffer: 1xTTE+7M urea; Temperature: 60°C 020604-2.0%; DNA: pGEM-3Zf(+) from the -21 M13 forward primer;
Capillary: 34/42cm; Injection: 75V/cm, 8s;
Run: 225 V/cm; Buffer: 1xTTE+7M urea; Temperature: 60°C 020604-2.0%; DNA: pGEM-3Zf(+) from the -21 M13 forward primer;
Capillary: 34/42cm; Injection: 75V/cm, 8s;
Run: 225 V/cm; Buffer: 1xTTE+7M urea; Temperature: 60°C POP6
Capillary: L=34cm, ID=75μm
Injection: 41V/cm, 30s; Run: 200V/cm; 50°C POP6
Capillary: L=34cm, ID=75μm
Injection: 41V/cm, 30s; Run: 200V/cm; 50°C POP6
Capillary: L=34cm, ID=75μm
Injection: 41V/cm, 30s; Run: 200V/cm; 50°C BigDye Terminator v3.0
Injection Voltage/Time: 47.6 V/cm 15 sec.
Running Voltage/cm: 200 V/cm
Capillary length: 31 cm, ID/OD = 49/361 μm Temperature: 60 C
Running Buffer: 1xTTE+7M Urea BigDye Terminator v3.0
Injection Voltage/Time: 47.6 V/cm 15 sec.
Running Voltage/cm: 200 V/cm
Capillary length: 31 cm, ID/OD = 49/361 μm Temperature: 60 C
Running Buffer: 1xTTE+7M Urea BigDye Terminator v3.0
Injection Voltage/Time: 47.6 V/cm 15 sec.
Running Voltage/cm: 200 V/cm
Capillary length: 31 cm, ID/OD = 49/361 μm Temperature: 60 C
Running Buffer: 1xTTE+7M Urea BigDye Terminator v3.0
Injection Voltage/Time: 47.6 V/cm 15 sec.
Running Voltage/cm: 200 V/cm
Capillary length: 31 cm, ID/OD = 49/361 μm Temperature: 60 C
Running Buffer: 1xTTE+7M Urea Blue-G Medium: POP6-201117
DNA: BigDye v3.0
Buffer:1x(ABI buffer with EDTA)
Capillary: L = 49cm; ID ~ 50μm
Temp:50°C
Run V: 200v/cm Blue-G Medium: POP6-201117
DNA: BigDye v3.0
Buffer:1x(ABI buffer with EDTA)
Capillary: L = 49cm; ID ~ 50μm
Temp:50°C
Run V: 200v/cm Blue-G Medium: POP6-201117
DNA: BigDye v3.0
Buffer:1x(ABI buffer with EDTA)
Capillary: L = 49cm; ID ~ 50μm
Temp:50°C
Run V: 200v/cm FIG. 12A  MPN-Blue-G Running Voltage/cm: 195.5 V/cm
Injection Voltage/cm: 27 V/cm
60°C, Cap.Length: 33cm; ID/OD:50/361 μm
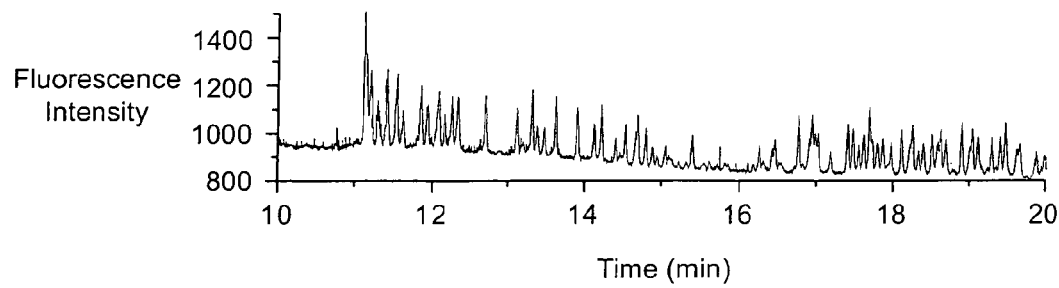
FIG. 12B  MPN-Blue-G Running Voltage/cm: 195.5 V/cm
Injection Voltage/cm: 27 V/cm
60°C, Cap.Length: 33cm; ID/OD:50/361 μm
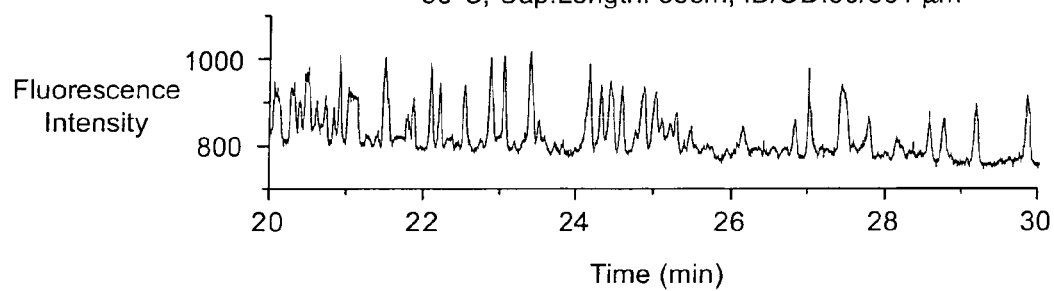
FIG. 12C  MPN-Blue-G Running Voltage/cm: 195.5 V/cm
Injection Voltage/cm: 27 V/cm
60°C, Cap.Length: 33cm; ID/OD:50/361 μm
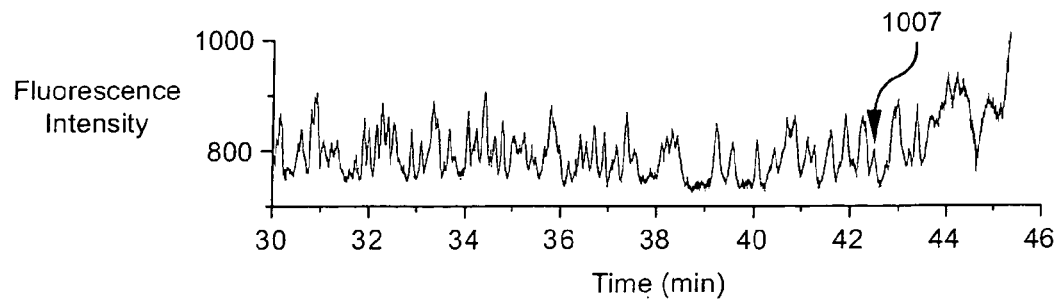

QUASI-INTERPENETRATING NETWORKS USED AS SEPARATION MEDIA

This invention was made with Government support under National Human Genome Research Institute Grant No. 5R01HG01386-07-8. The Government has certain rights in the invention.

BACKGROUND OF INVENTION

The present invention relates generally to the art of separating charged molecular species, and, in particular, to separation media that are used for capillary electrophoresis.

Gel electrophoresis is one of the most widely used separation techniques in the biologically related sciences. Charged molecular species such as proteins, peptides, nucleic acids and oligonucleotides are separated by causing the species to migrate in a buffer medium under the influence of an applied electric field. The buffer medium normally is used in conjunction with a low to moderate concentration of an appropriate gelling agent to promote the separation and to minimize the occurrence of mixing the species being separated.

Until recently, electrophoretic separations were conducted in gel slabs or open gel beds that were typically fabricated of agarose or cross-linked polyacrylamide materials. More recently, capillary electrophoresis ("CE") using a polymer gel or solution as a separation medium has been used for the separation of charged molecules, such as DNA. Capillary electrophoresis techniques combined with photometric detection methods have allowed the automation and rapid quantitative analysis of charged molecules. Furthermore, capillary electrophoresis can provide quantitative information about a sample using very small amounts of the sample, gel (or polymer solution) and buffer relative to traditional slab gel processes. Moreover, high-resolution separation of charged macromolecules having different effective charges has been achieved.

Typically, the capillary columns used in capillary electrophoresis are fabricated from fused silica tubing having diameters on the order of 25 μm to 200 μm and lengths from about 30 cm to about 200 cm. The column interior is filled with a gel or solution separation medium, along with a buffer. Electrophoretic techniques are used to separate charged molecular species.

The separation medium is one of the most important parameters in CE since it determines the migration behavior, including the resolution, of charged molecular species (e.g., DNA fragments). Polymer solutions are widely used at present for such media.

Several synthetic hydrophilic homopolymers have been developed and tested as DNA separation media, including linear polyacrylamide (LPA); and alkyl-substituted derivatives, such as poly-N,N-dimethylacrylamide (PDMA), poly-N-acryloylamino-ethoxyethanol (PAAEE), polyacryloylaminopropanol (PAAP), poly(acryloylaminoethoxy) ethylglucopyranoside (PAEG), polyethylene glycol (PEG), and polyethylene oxide (PEO).

The electrophoresis community largely agrees that highly entangled solutions of LPA have generally provided the best sequencing separations, making it possible to separate DNA molecules differing by a single base for fragments up to 1300 bases in length. (Zhou et al., *Anal. Chem.* 72:1045–52 (2000).) The excellent performance of LPA is believed to result in part from its hydrophilic nature.

Although LPA provides superb DNA separations for long read sequencing, it has the disadvantage of requiring the use of a stable capillary wall coating for suppression of electro-osmotic flow (EOF) and prevention of analyte absorption. Electro-osmotic flow is caused by the inability of a separation medium to bind directly to the inner wall of the capillary tubes. This highly problematic flow occurs upon the application of an electric field during separations. An electrical double layer is generated by the attraction of soluble buffer ions to the charged surface of the capillary wall. An excess in the local concentration of ions in the solution near the wall develops so that charge neutrality may be maintained proximal to the wall. The net result is that charged channel walls engender a bulk flow of fluid during electrophoresis. Electro-osmotic flow results in highly unsatisfactory separation results.

Traditional methods aimed at preventing EOF include introducing a compound that binds to the inner surface of a capillary tube wall prior to injecting the separation medium into the tube. For example, U.S. Pat. No. 5,447,617 to Shieh describes covalently bonding polybutadiene to the inner surface of a capillary tube, introducing acrylamide monomers therein and copolymerizing the acrylamide with the polybutadiene. Such precoating techniques increase cost and give rise to problems such as capillary fouling, coating inhomogeneity, and limited shelf life for coated capillary tubings.

To avoid the problem of EOF, less hydrophilic polymers have been used as separation media. For example, poly (vinyl pyrrolidone) (PVP) has been used as a DNA sequencing matrix. Since PVP dynamically coats the capillary tube walls, the need for precoating the walls is obviated. However, the separation results of PVP are much poorer than those achieved with LPA. The separation of only slightly more than 300 contiguous DNA bases has been achieved with PVP. The limiting characteristic of PVP is its excessive nonspecific (hydrophobic) interaction between the sieving matrix and fluorescent dyes used during separations. Such interaction obscures the separation of larger DNA fragments.

The development of a high performance separation medium, which possesses high sieving ability, low viscosity and dynamic coating ability, will facilitate the automation of CE and further enhance its performance. However, homopolymers which posses all these properties have not heretofore been found. Accordingly, mixtures of different homopolymers have been investigated.

Mixtures of the same polymer, such as PEO, hexaethyl cellulose (HEC) and LPA, with different molecular weights and mixtures of two modified polysaccharides, i.e., agarose and HEC, have been found to produce a better resolution for both small and large DNA fragments. However, a mixture of two polymers with totally different chemical structures has never been successfully used. Kim et al. (Kim, Y., Yeung, E. S., *J. Chromatogr. A.*, 1997, 781, 315–325) tried to use a mixture of PEO and hexapropyl cellulose (HPC) for DNA sequencing and found the separation to be very poor. The failure was attributed to the incompatibility of the two polymers.

Another challenge in CE is the introduction of separation matrices, which are usually quite viscous, into the narrow capillary tubes. The polymerization of polyacrylamide within a capillary tube avoids the problem of forcing the polymeric solution into the capillary tube or microchannels. It is also desirable to remove "used" polymer matrix out of the capillary tube after each use and refill the capillary tube with fresh matrix. However, once the polyacrylamide is polymerized within a capillary tube, the polymerized gel cannot be easily removed from the capillary tube.

Recently, copolymers with viscosity dependent behavior have been employed. Such copolymers allow the loading and unloading of the medium in low viscosity states, and electrophoretic separation in a high viscosity state. For example, matrices based on a hydrophilic backbone of LPA with short grafts of low molar mass (N-isopropylacrylamide) have been described. (Sudor et al. *Electrophoresis* 22:720–8 (2001).) Also, matrices based on a copolymer of N,N-dimethylacrylamide and N,N-diethylacrylamide ("P(DMA/DEA)") has been tested. (Buchholz et al. Anal Chem 73:157–64. (2001).) However, the synthesis of copolymers is difficult to control and reproduce, leading to unreliable results.

A successful separation medium for electrophoresis would include properties such as stability; neutrality; appropriate mesh size; dynamic coating ability (to efficiently suppress electro-osmosis); low viscosity; the use of a minimal amount of medium material; and providing good separation results and long read lengths. Before the present invention, a medium that would provide some desirable properties, e.g., a long read length, typically would not allow for other desirable properties, e.g., dynamic coating ability.

SUMMARY OF INVENTION

In one embodiment, the present invention provides a quasi-interpenetrating network of polymer chains, the chains comprising: linear polyacrylamide (LPA) chains in the form of a main frame having a weight average molecular weight of approximately 0.05 million to approximately 25 million g/mole, and a radius of gyration of approximately 10 nm to 350 nm; and polydimethylacrylamide (PDMA) chains prepared by polymerizing PDMA in the presence of the LPA main frame, wherein the chains are entangled within one another and interpenetrate one another, and wherein the quasi-IPN has substantially no chemical cross-linking.

In another embodiment, the present invention provides a quasi-interpenetrating network of entangled polymer chains, the chains comprising: linear polyacrylamide (LPA) chains; and polydimethylacrylamide (PDMA) chains entangled in the LPA chains and interpenetrating the LPA chain, wherein the LPA and the PDMA have weight-average molecular weight of approximately 0.1 million to approximately 20 million g/mole, and a radius of gyration of approximately 15 nm to 320 nm, wherein the quasi-IPN has substantially no chemical cross-linking.

In another embodiment, the present invention provides a quasi-interpenetrating network of entangled polymer chains produced by a method comprising providing a solution comprising linear polyacrylamide (LPA) and a buffer, wherein the LPA has a weight average molecular weight of 0.05 million to 25 million g/mole; providing a solution comprising polydimethylacrylamide (PDMA) and a buffer, wherein the PDMA has a weight average molecular weight of 100,000 to 25 million; mixing the LPA/buffer solution and PDMA/buffer solution in a stepwise fashion, wherein the LPA/buffer solution is one to fifteen times as concentrated as the PDMA/buffer solution, and the volume of the LPA/buffer solution is about one to fifty times the volume of the PDMA solution; wherein a quasi-interpenetrating network of entangled interpenetrating LPA and PDMA polymer chains is produced, wherein the quasi-IPN has substantially no chemical cross-linking.

In another embodiment, the present invention provides a method of separating charged molecular species. The method comprising causing a charged molecular species to migrate in a separation medium by the influence of an applied electric field, the improvement wherein the separation medium comprises an LPA polymer system and a PMDA polymer system wherein the polymer systems form a quasi-interpenetrating network.

In another embodiment, the present invention provides a quasi-interpenetrating network of polymer chains, the chains comprising: acrylamide(AM)/dimethylacrylamide (DMA) random copolymer chains in the form of a main frame having a weight average molecular weight of approximately 0.05 million to approximately 2 million g/mole, and a radius of gyration of approximately 10 nm to 80 nm; and polydimethylacrylamide (PDMA) chains prepared by polymerizing PDMA in the presence of the random copolymer main frame; wherein the chains are entangled within one another and interpenetrate one another, and wherein the quasi-IPN has substantially no chemical cross-linking.

In another embodiment, the present invention provides a quasi-interpenetrating network of entangled polymer chains produced by a method comprising providing a solution comprising AM/DMA random copolymer and a buffer, wherein the AM/DMA random copolymer has a weight average molecular weight of 0.05 million to 2 million g/mole; providing a solution comprising polydimethylacrylamide (PDMA) and a buffer, wherein the PDMA has a weight average molecular weight of 0.05 million to 25 million g/mole; mixing the copolymer/buffer solution and PDMA/buffer solution in a stepwise fashion, wherein the copolymer/buffer solution is one to fifty times as concentrated as the PDMA/buffer solution, and the volume of the copolymer/buffer solution is about one to twenty times the volume of the PDMA solution; wherein a quasi-interpenetrating network of entangled copolymer and PDMA polymer chains is produced.

In another embodiment, the present invention provides a method of separating charged molecular species. The method comprising causing a charged molecular species to migrate in a separation medium by the influence of an applied electric field, the improvement wherein the separation medium comprises an AM/DMA random copolymer and a PMDA polymer wherein the polymer systems form a quasi-interpenetrating network.

MegaBACE buffer, at 44° C. and 150 V/cm. Capillary length is 34 cm, ID/OD=75/365 (μm). Separation was performed in a laboratory-built instrument.

Figure 7A:
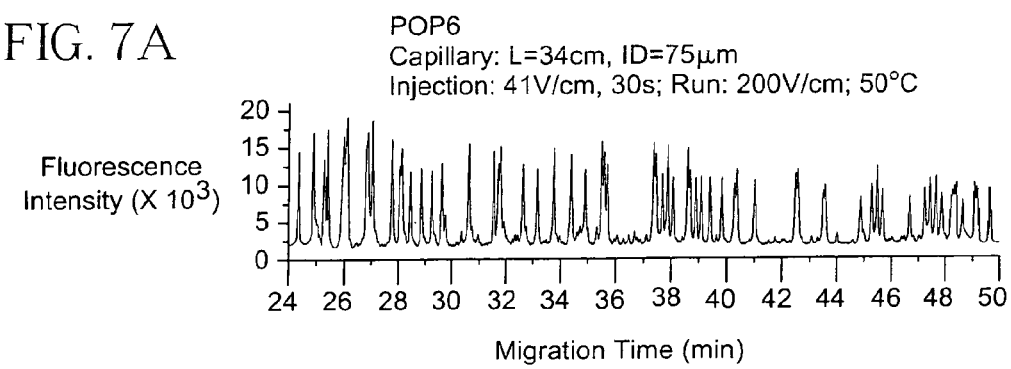
Figure 7B:
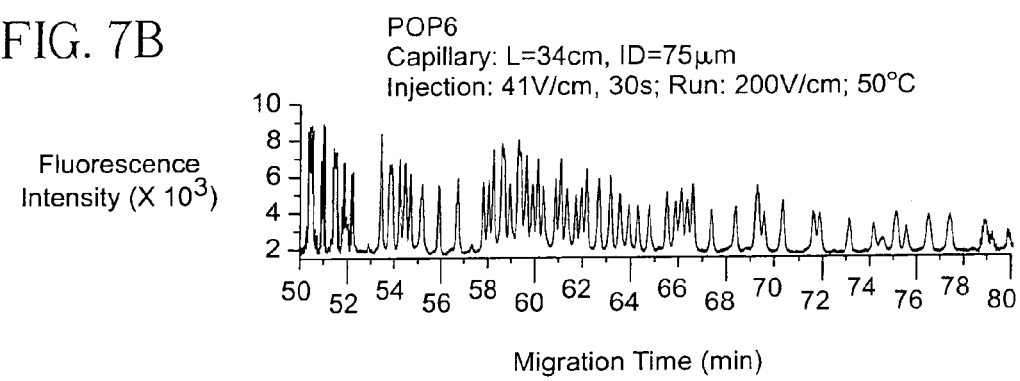
Figure 7C:
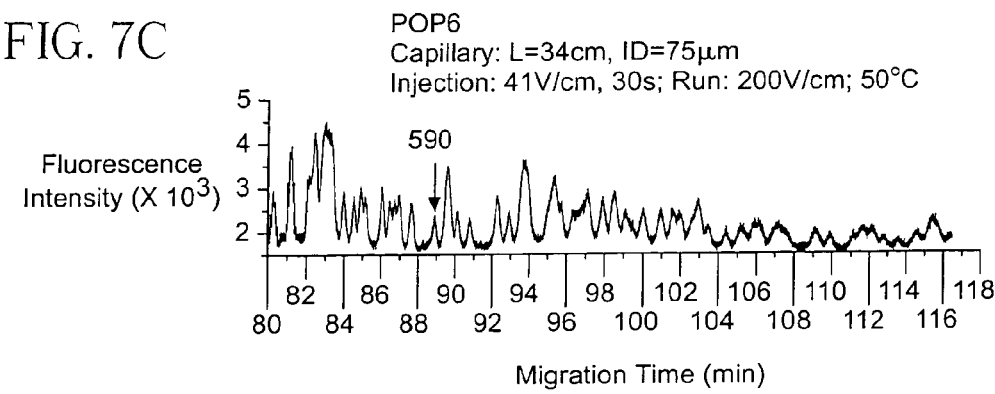
Figure 8A:
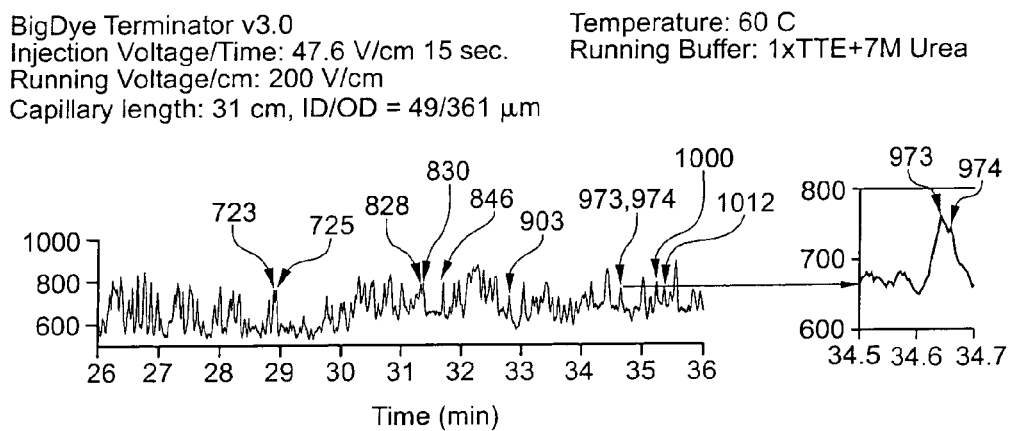
Figure 8B:
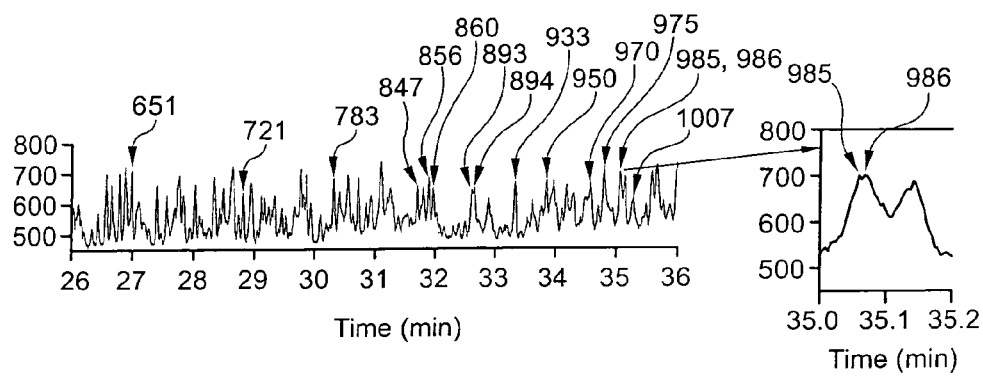
Figure 8C:
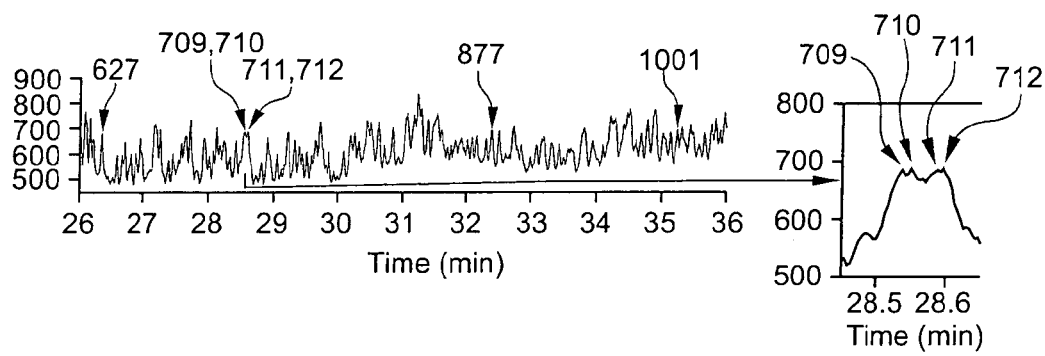
Figure 8D:
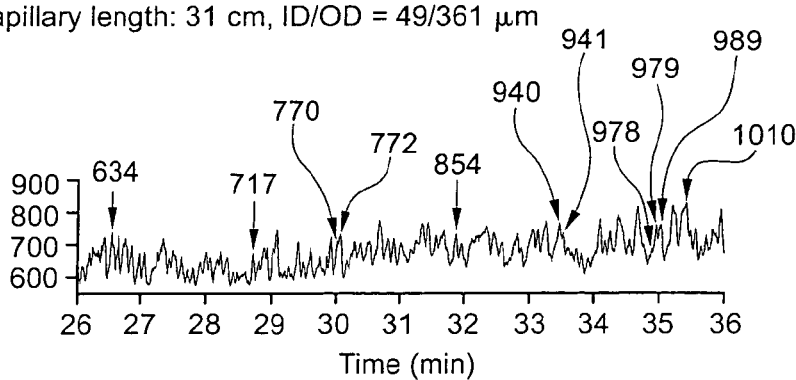

FIG. 7 shows the separation of DNA [pGEM-3Zf(+) from the-21M13 forward Primer] by CE in POP6/1×TTE buffer, at 50° C. and 200 V/cm. Capillary length is 34 cm, ID/OD=75/365 (μm). Separation was performed in a laboratory-built instrument.

FIG. 8 shows the last parts (base number from 600 to ~1000) of electrophoretic separation of DNA BigDye Terminator v3.0 by CE in quasi-IPN/1×TTE+7M Urea buffer solution, C=2.0% g/ml at 60° C. Instrument: ABI Prism 310 four colors single-capillary Genetic Analyzer.

Figure 9A:
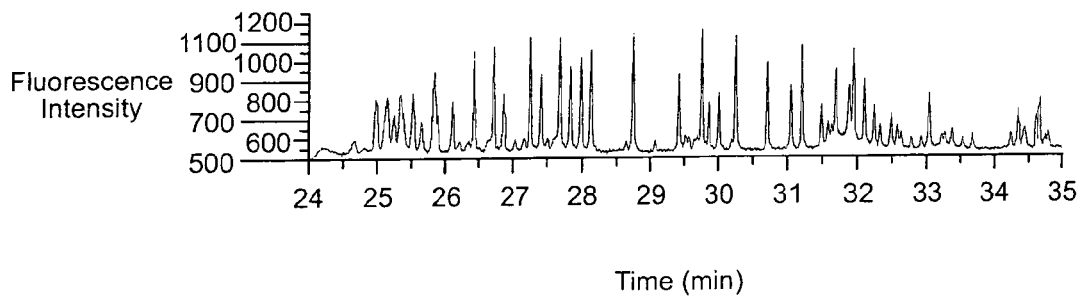
Figure 9B:
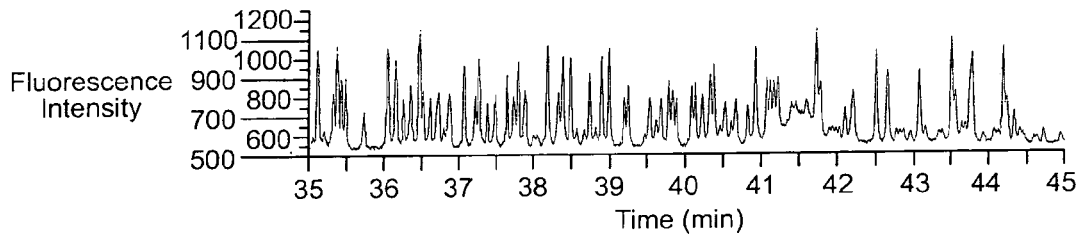
Figure 9C:
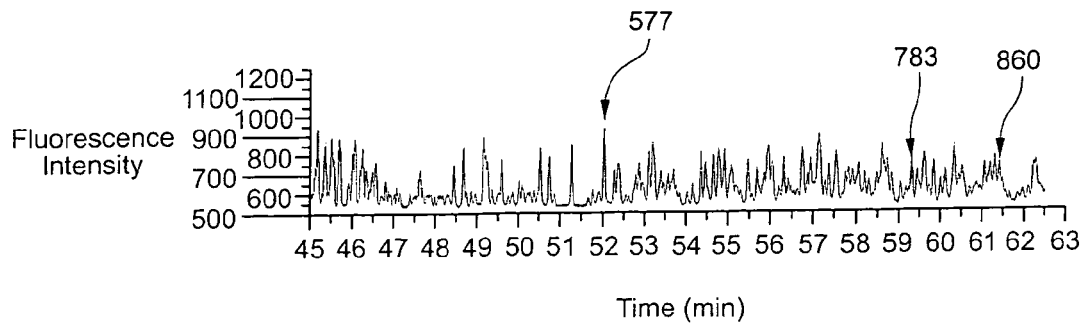
Figure 10A:
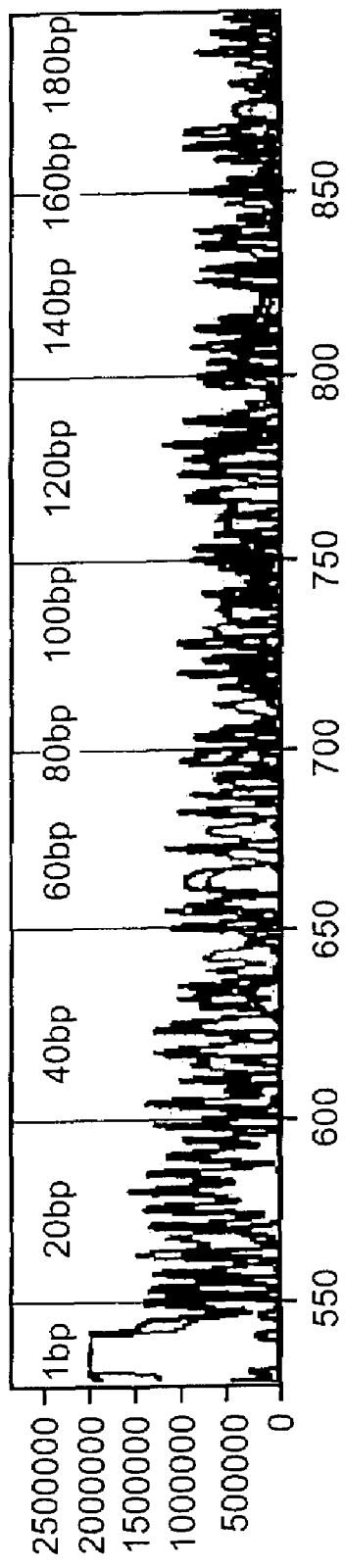
Figure 10B:
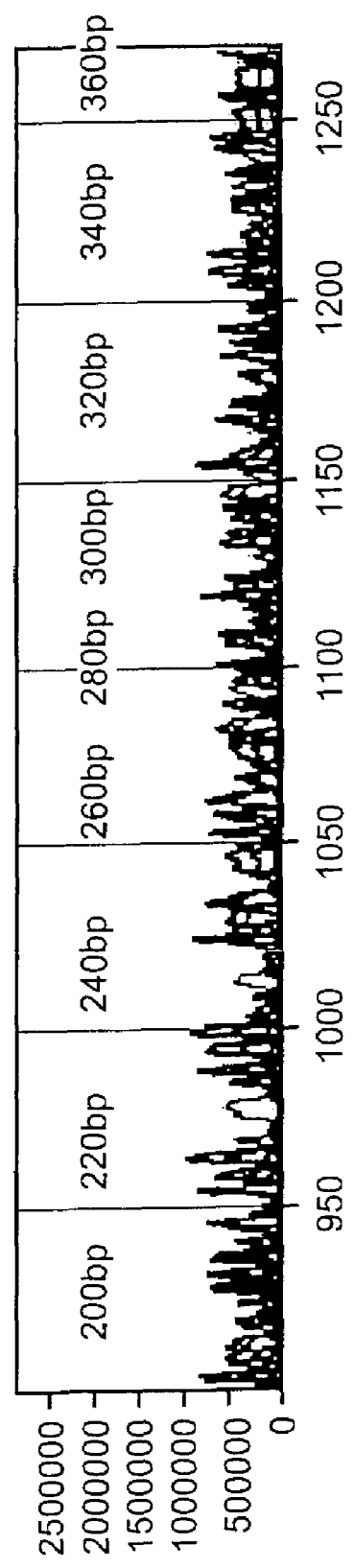
Figure 10C:
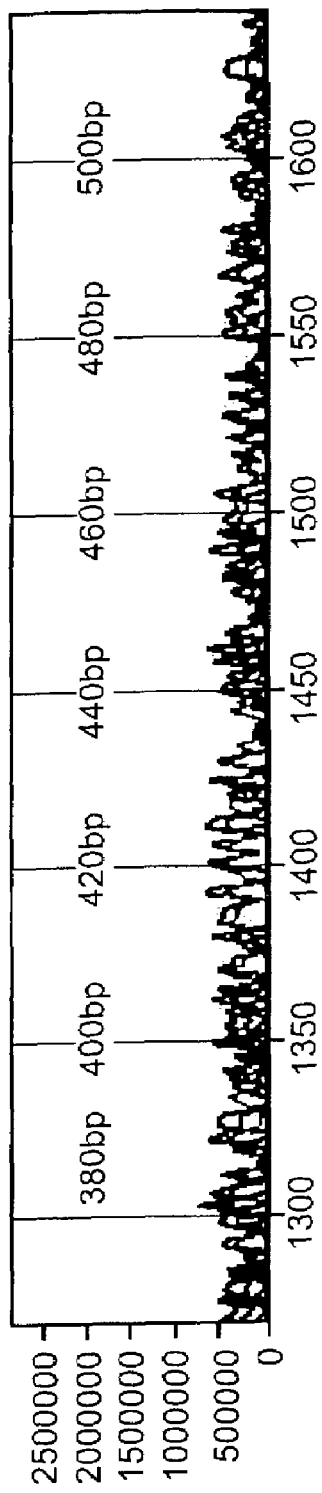
Figure 10D:
Figure 11A:
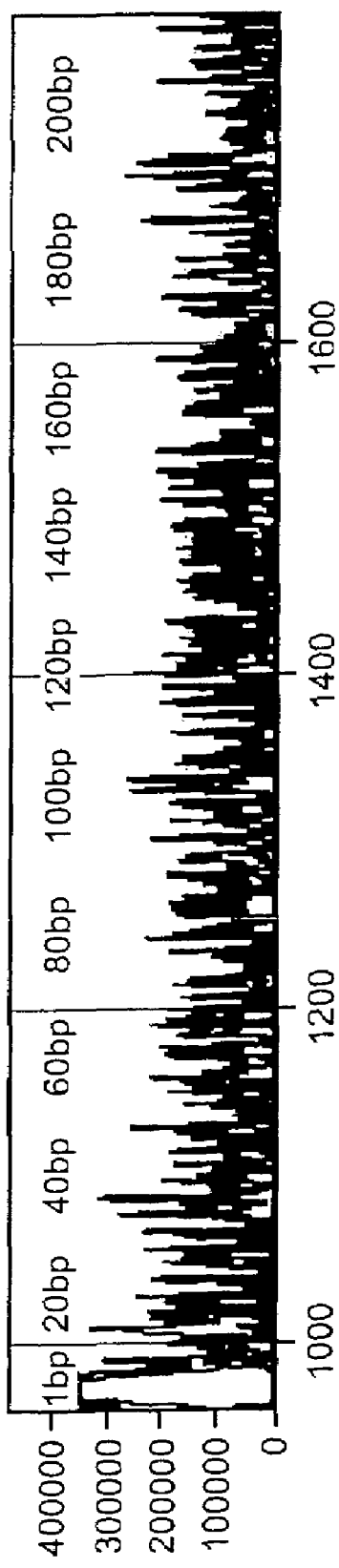
Figure 11B:
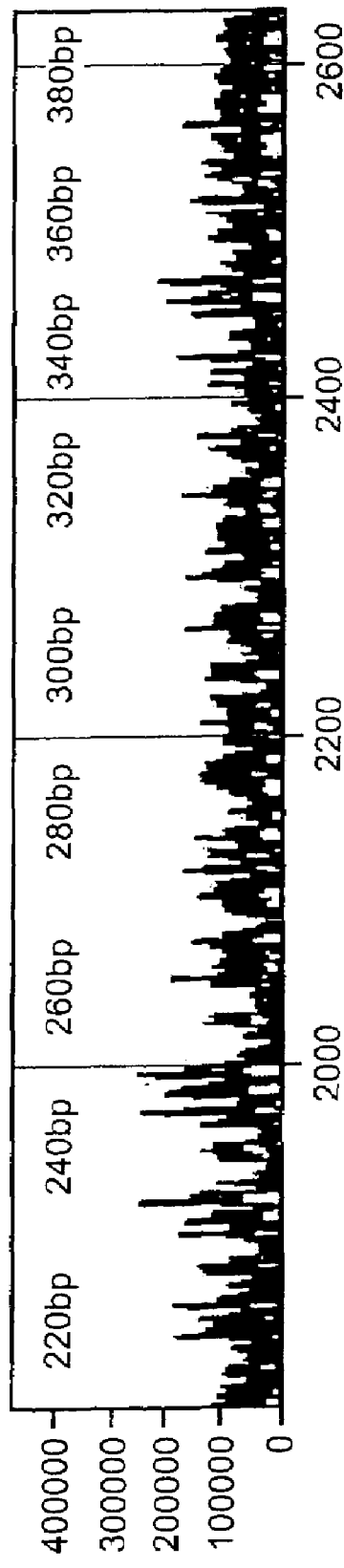
Figure 11C:
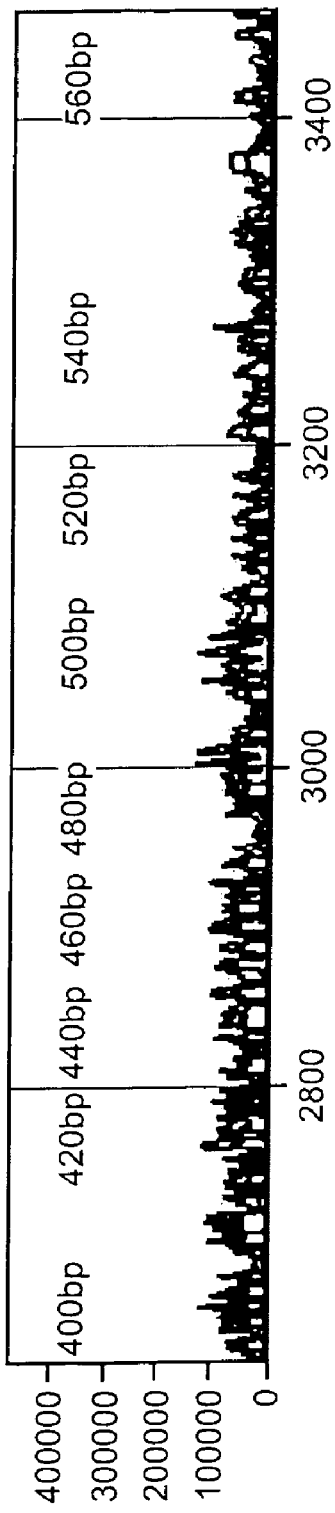
Figure 11D:
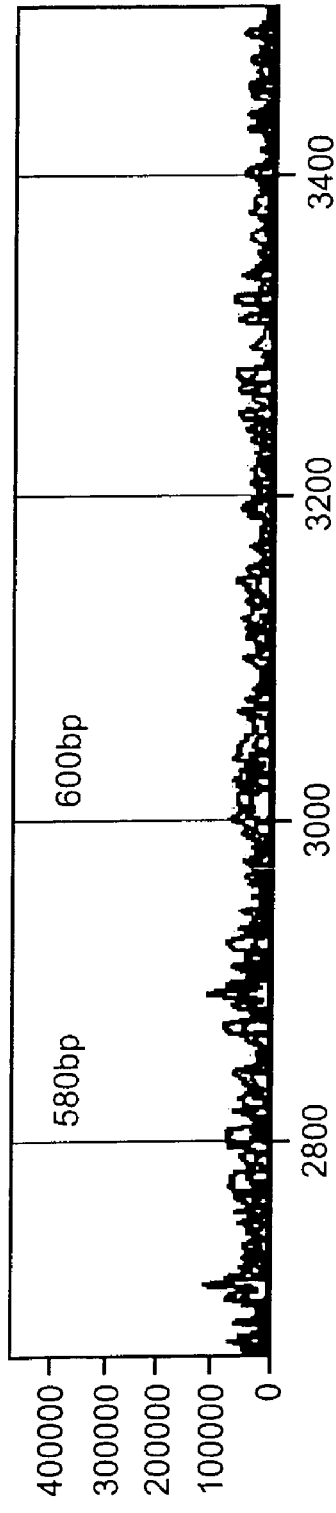

FIG. 9 shows the blue-G part of electrophoretic separation of DNA (BigDye Terminator v3.0) by CE in POP6/1×ABI buffer solution. Instrument: ABI Prism 310 four colors single-capillary Genetic Analyzer, at 50° C., Module seq POP6 (1 mL) E. Capillary ID/OD=50/361 (μm).

FIG. 10 shows four color DNA (BigDye Terminator v3.0) sequencing of 660 bp in less than ~33 min was achieved by using a Lab-made Sequencing Analyzer with 2.5% quasi-IPN/1×ABI buffer as the separation medium. (Instrument and base calling software were obtained from the Engineering College at Stony Brook University.)

FIG. 11 shows four color DNA (BigDye Terminator v3.0) sequencing of 600 base in ~63 min was achieved by Lab-made Sequencing Analyzer with POP7/1×ABI buffer as the separation medium. (Instrument and base calling software were obtained from the Engineering College at Stony Brook University.)

FIG. 12 shows the separation of DNA (BigDye Terminator v3.0) in LPA/PDMA quasi-IPN medium, in which the contents of LPA (weight-average MW=7.6×10$^6$ g/mole) and PDMA (weight-average MW~470K g/mole) are 83% and 17%, respectively. Running field is 195.5 V/cm, with injection time of DNA being 20 s at 27 V/cm. The capillary effective length is 33 cm, and ID/OD=50/361 (μm). Instrument: ABI Prism 310 four colors single-capillary Genetic Analyzer.

Figure 13A:
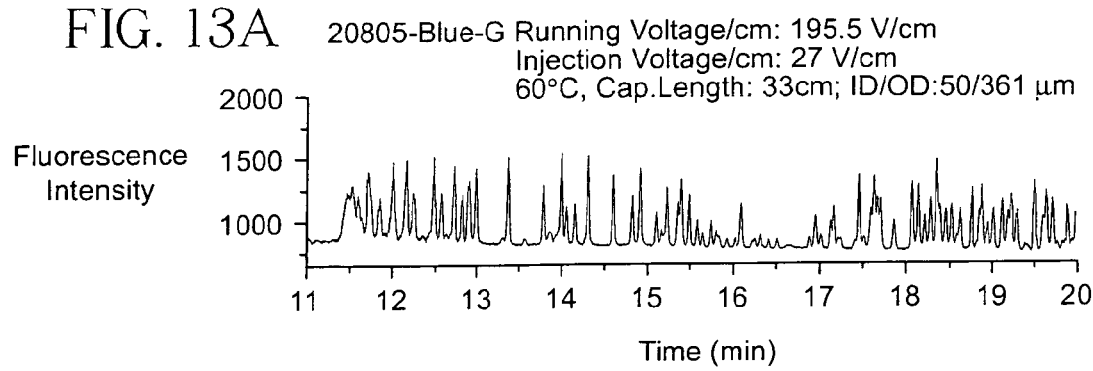
Figure 13B:
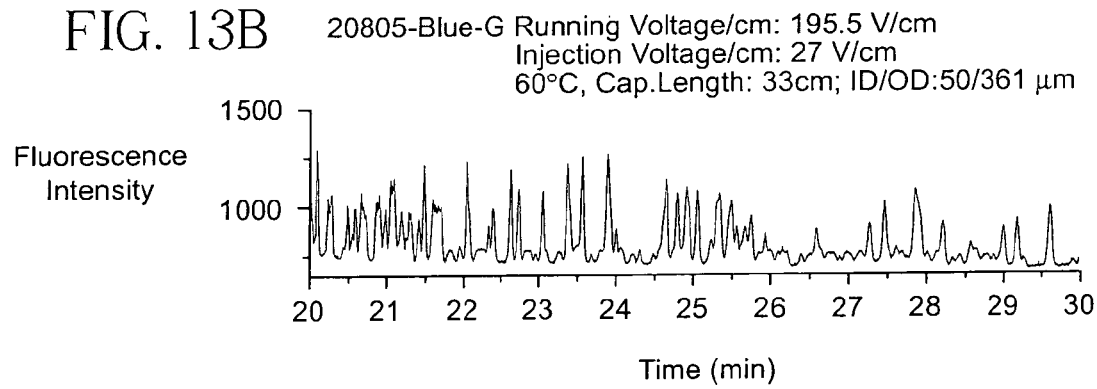
Figure 13C:
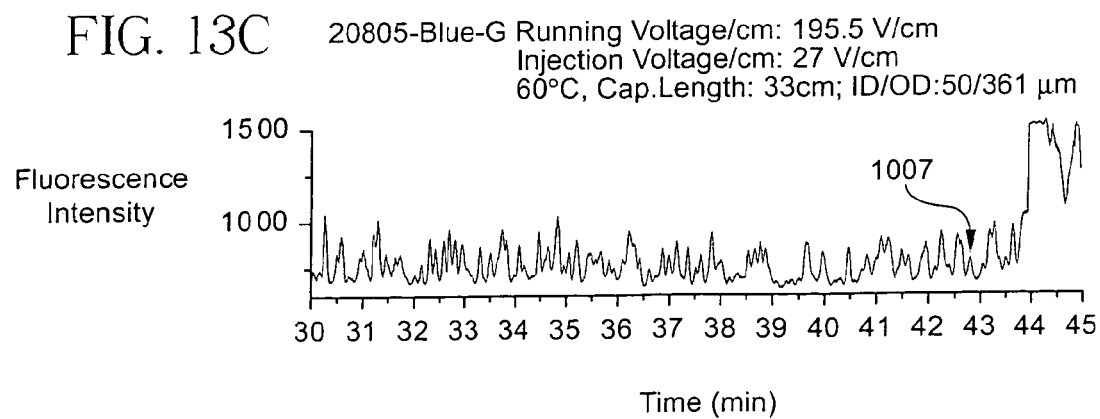

FIG. 13 shows the separation of DNA (BigDye Terminator v3.0) in quasi-IPN (20805) medium. The contents of PDMA and LPA in quasi-IPN are ~11% and ~89%, respectively. Running field is 195.5 V/cm, with injection time of DNA being 20 s at 27 V/cm. The capillary effective length is 33 cm, and ID/OD=50/361 (μm). Instrument: ABI Prism 310 four colors single-capillary Genetic Analyzer.

Figure 14:
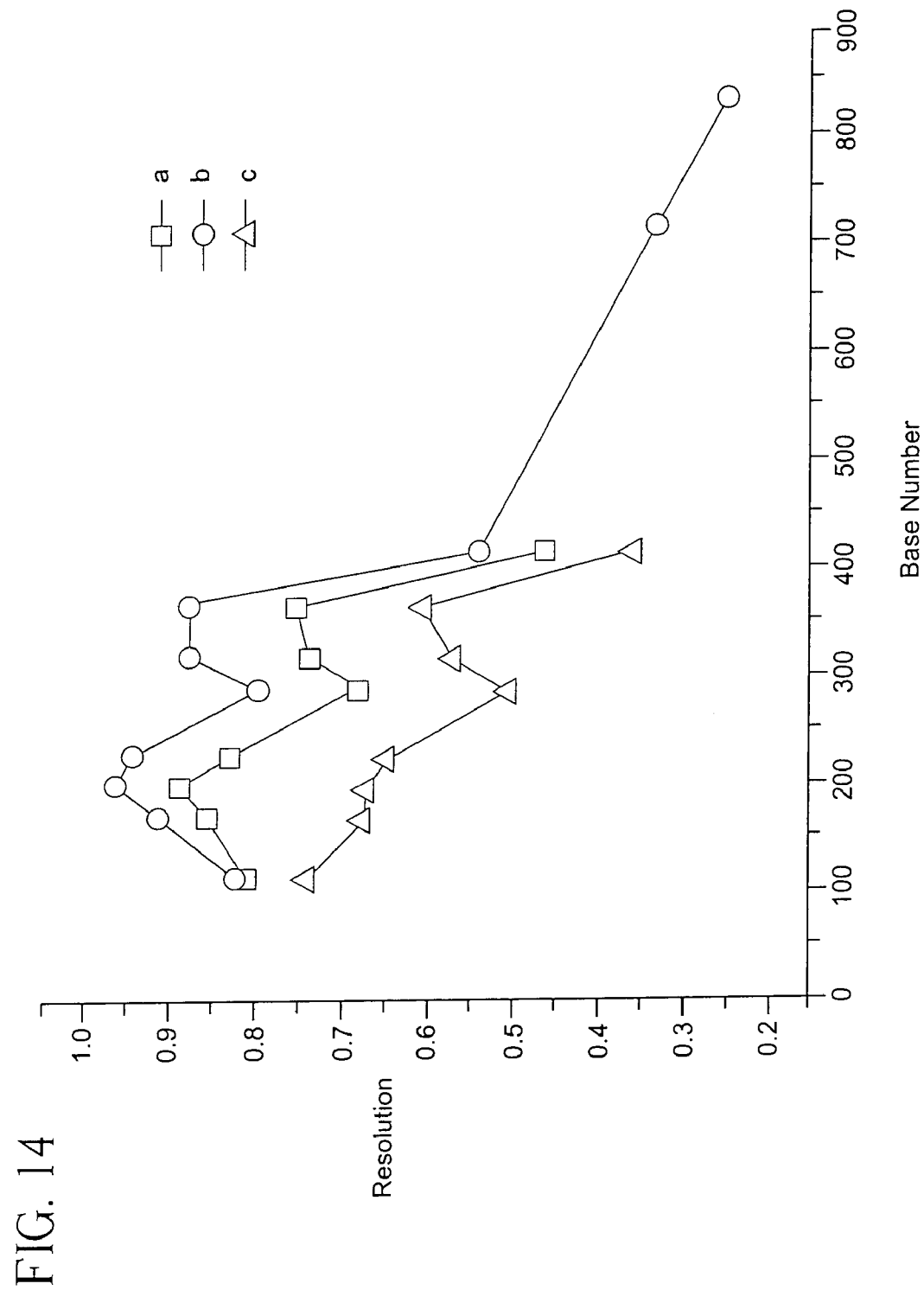

FIG. 14 shows the effects of varying DNA injection voltages of (a) 25 V/cm; (b) 75 V/cm; (c) 100 V/cm on the resolution of DNA separation. Separation was performed in a laboratory-built instrument. Injection time 10 sec; capillary effective length 35 cm; capillary ID=75 μm; running electric field=150 V/cm; buffer solution 1×TTE/7M urea; DNA: pGEM3Zf(+) (C-mix).

Figure 15:
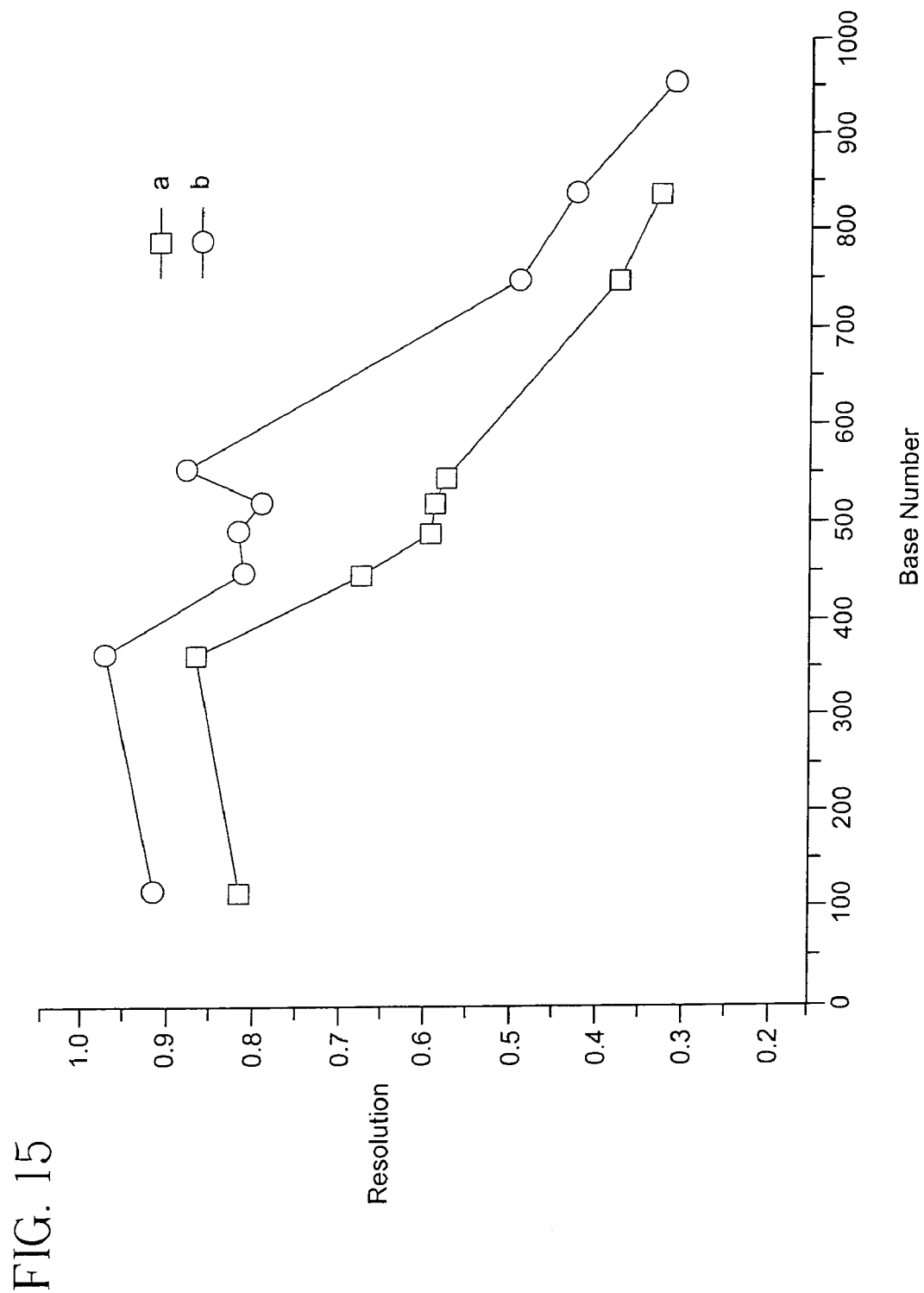

FIG. 15 shows the change in the resolution of DNA separations at effective column lengths of (a) 35 cm and (b) 40 cm. Separation was performed in a laboratory-built instrument. Injection voltage and time=75 V/cm for 10 sec. The instrument running conditions and DNA sample are the same as described in FIG. 14.

Figure 16A:
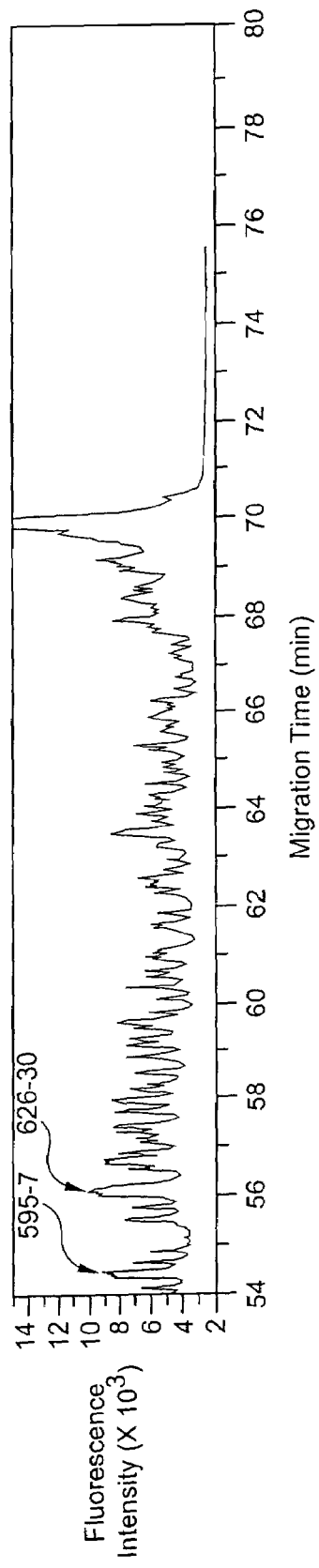
Figure 16B:
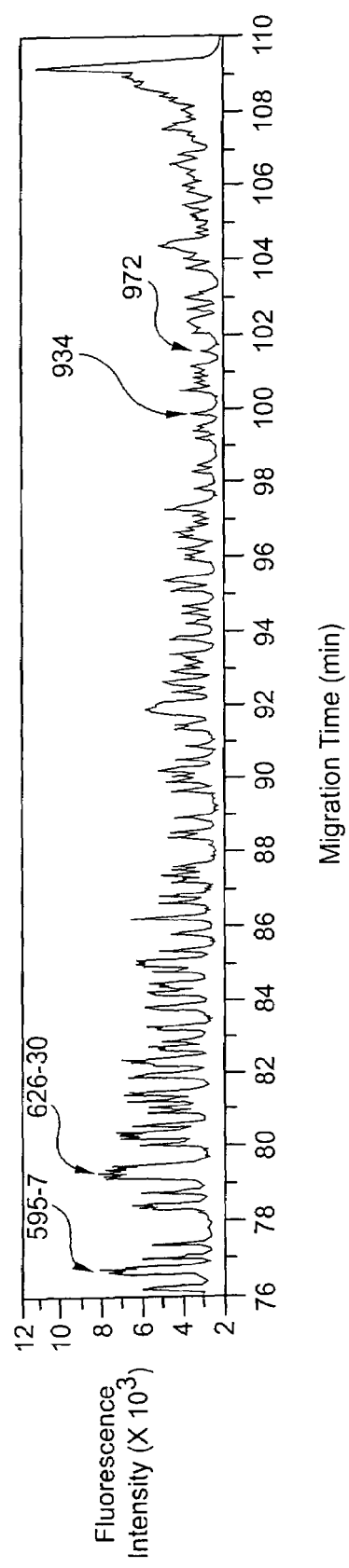
Figure 17A:
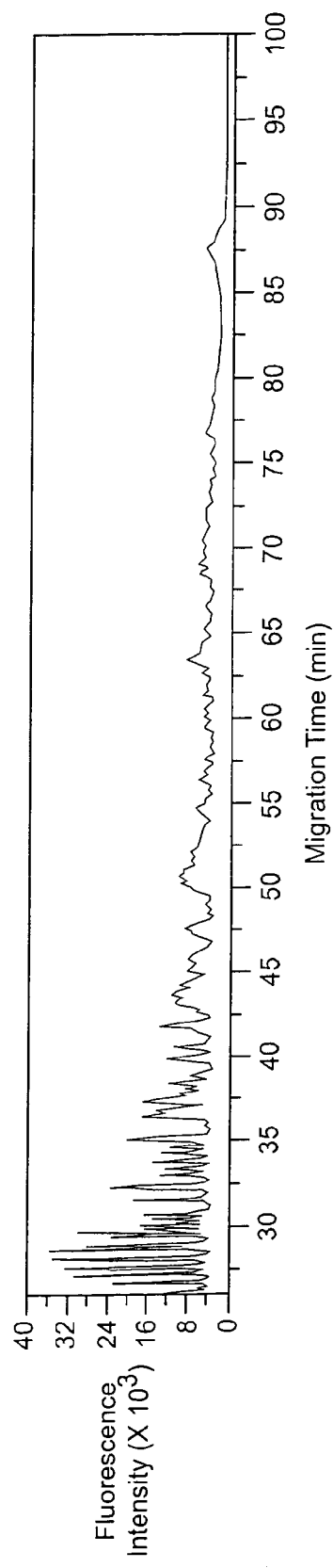
Figure 17B:
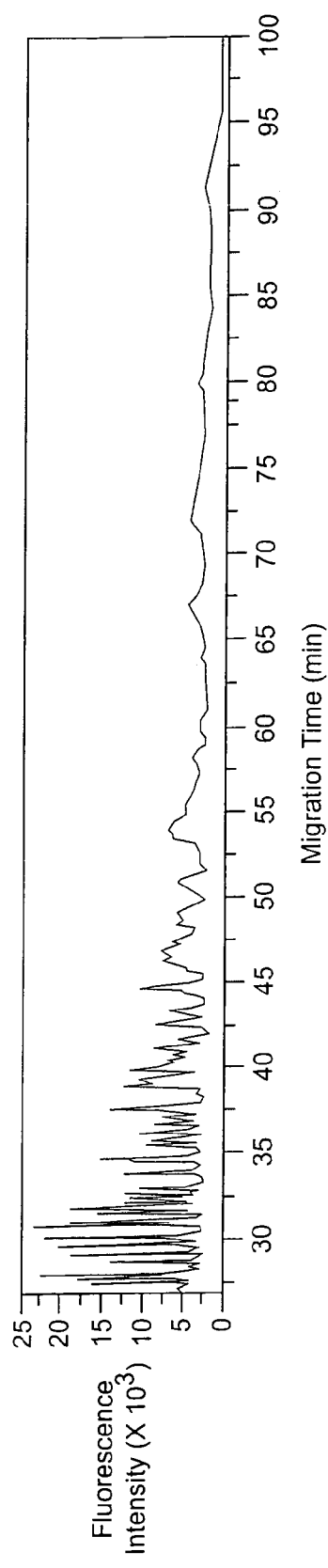
Figure 17C:
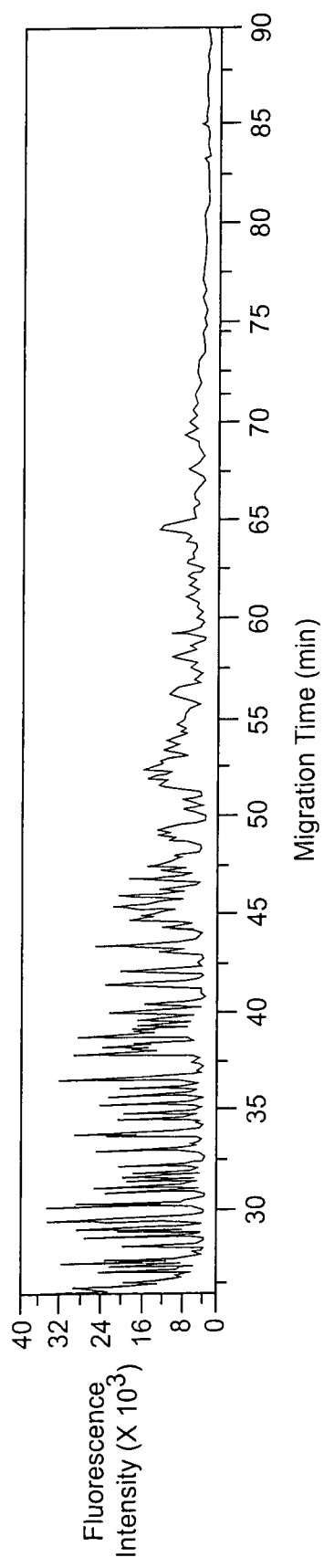
Figure 17D:
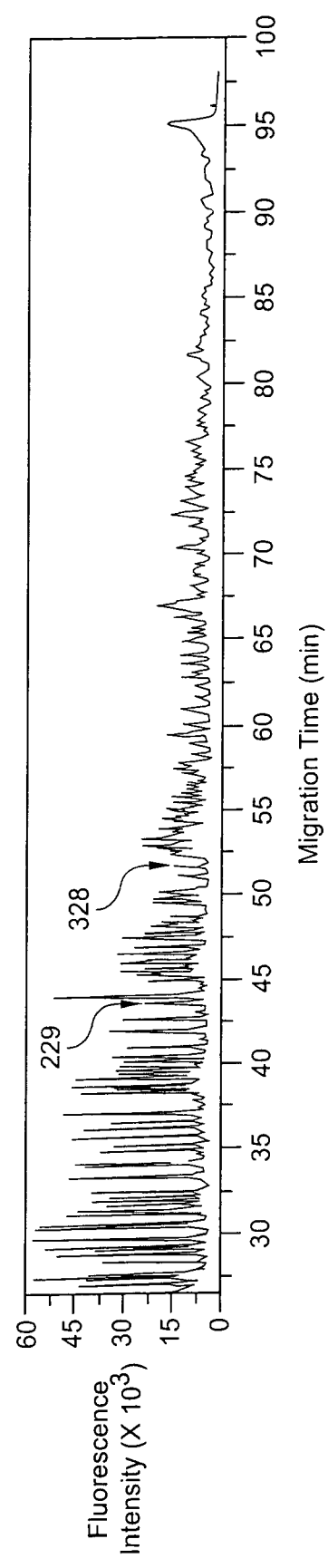
Figure 17E:
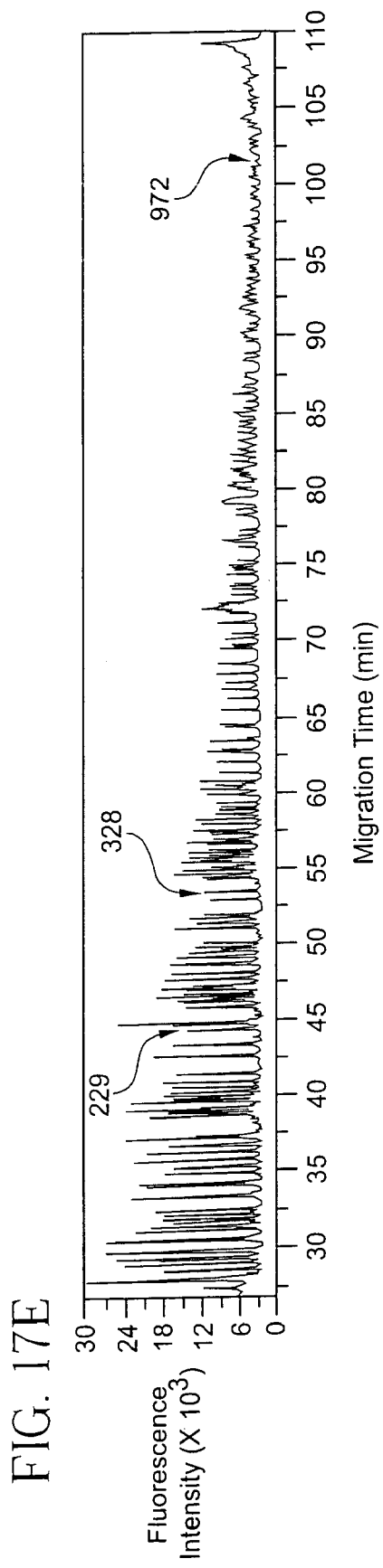

FIG. 16 shows the electropherogram of pGEM3Zf(+) after 581 bases at a running electric field strength of (a) 200 and (b) 150 V/cm. Separation was performed in a laboratory-built instrument. Injection voltage and time=75 V/cm for 10 sec; effective capillary length=40 cm. The instrument running conditions and DNA sample are the same as described in FIG. 14.

FIG. 17 shows the separations of DNA sequencing sample by using the quasi-IPNs with a LPA to PDMA ratio of (a) 1:0 (non-coated capillary) (b) 1.62:1 (c) 3.33:1 (d) 6.33:1 (e) 10.9:1 as the separation media. Separation was performed in a laboratory-built instrument. Injection voltage and time=75 V/cm for 10 sec; effective capillary length=40 cm. The instrument running conditions and DNA sample are the same as described in FIG. 14.

Figure 18:
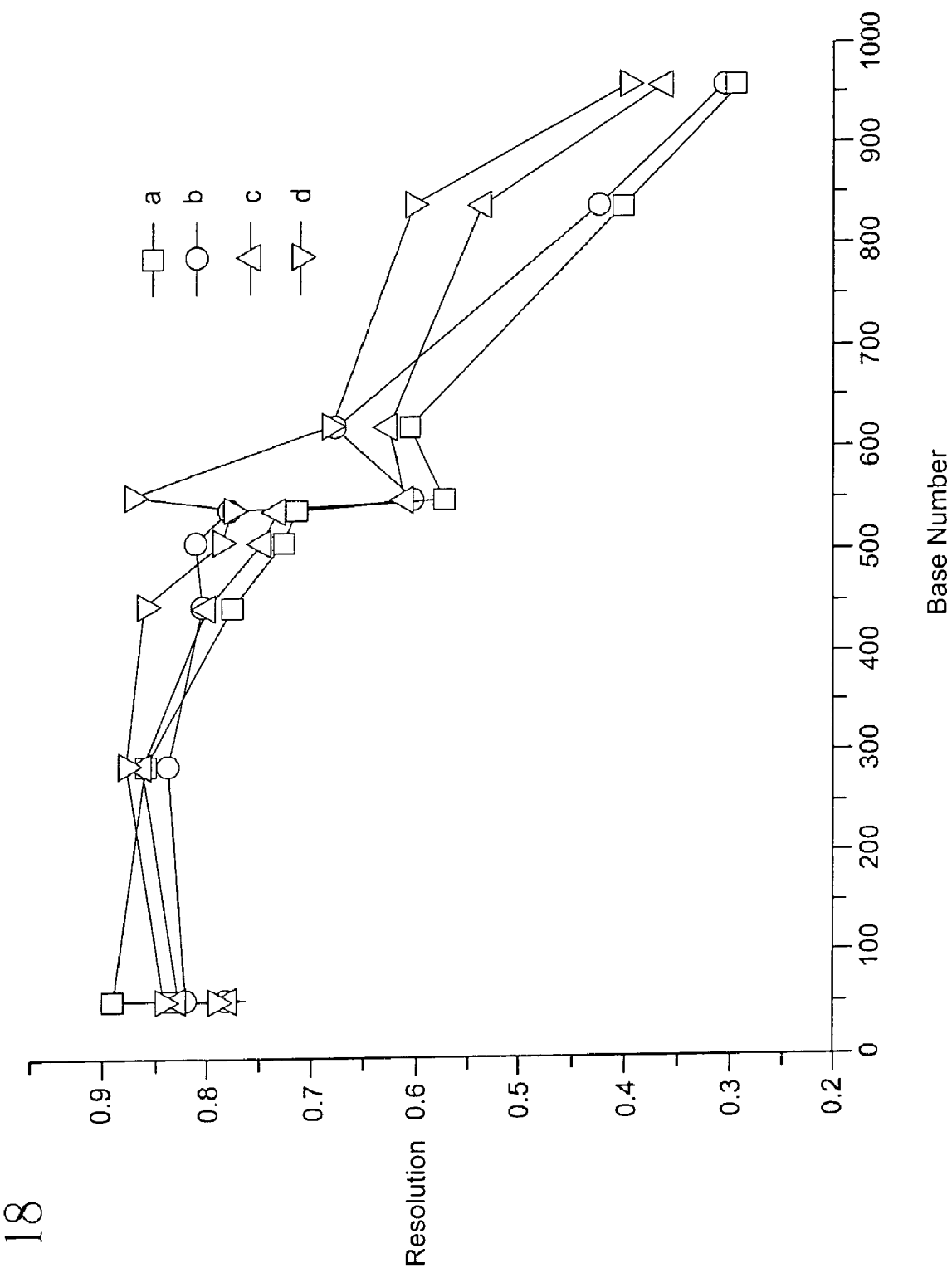

FIG. 18 shows the effect of LPA molecular weight on DNA separation: (a) $M_v$=4.53×10$^6$ g/mole; (b) $M_v$=6.4×10$^6$ g/mole; (c) $M_v$=7.69×10$^6$ g/mole; (d) $M_v$=9.91×10$^6$ g/mole. Separation was performed in a laboratory-built instrument. Injection voltage and time=75 V/cm for 10 sec; effective capillary length=40 cm. The instrument running conditions and DNA sample are the same as described in FIG. 14.

FIG. 19 shows a comparison of the DNA separation results wherein the LPA was prepared by (a) emulsifier-free polymerization and (b) inverse microemulsion polymerization. Separation was performed in a laboratory-built instrument. Injection voltage and time=75 V/cm for 10 sec; effective capillary length=40 cm. The instrument running conditions and DNA sample are the same as described in FIG. 14.

Figure 20A:
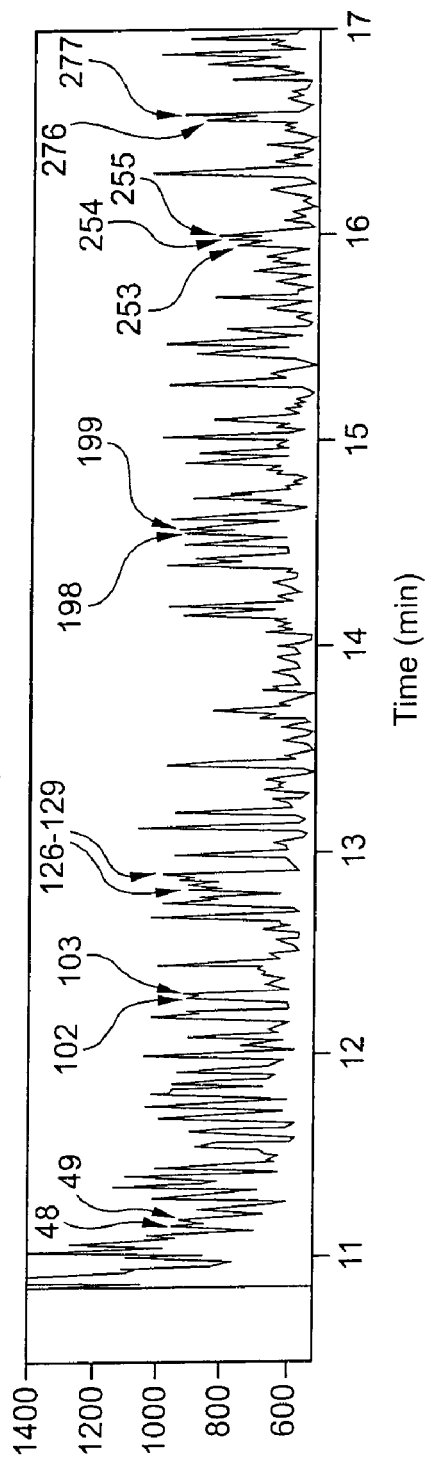
Figure 20B:
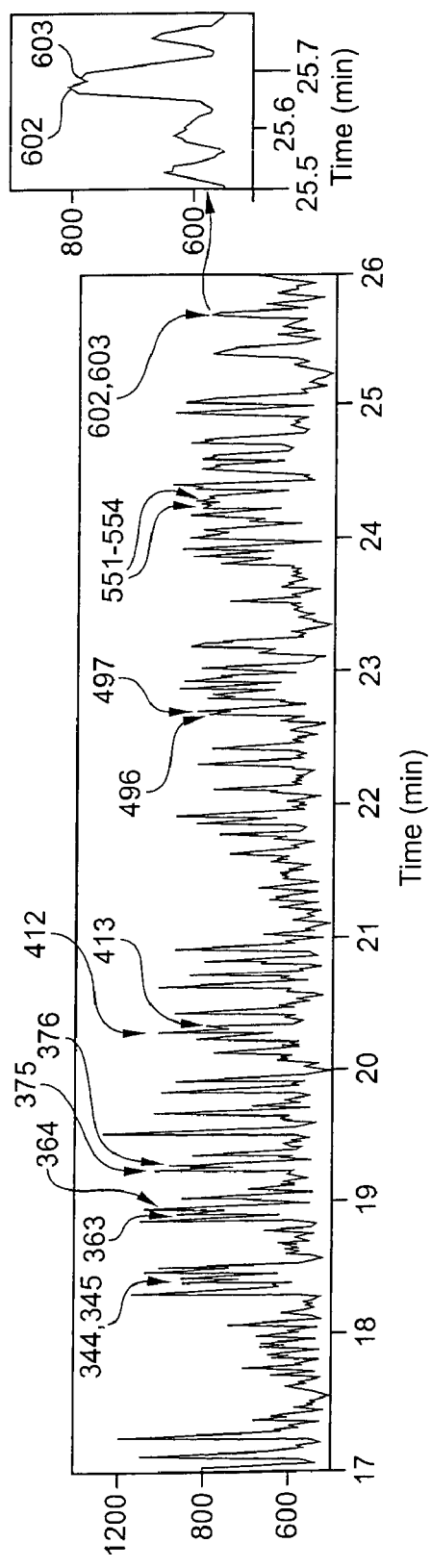
Figure 20C:
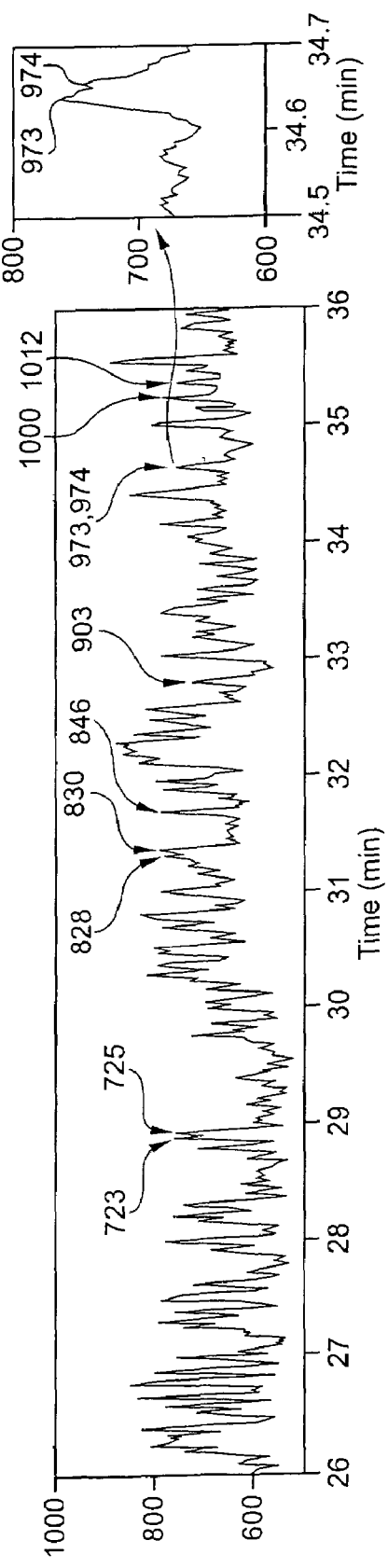

FIG. 20 shows the yellow-T part of electropherogram of DNA (BigDye Terminator v3.0). Instrument and running conditions are the same as in FIG. 8.

Figure 21:
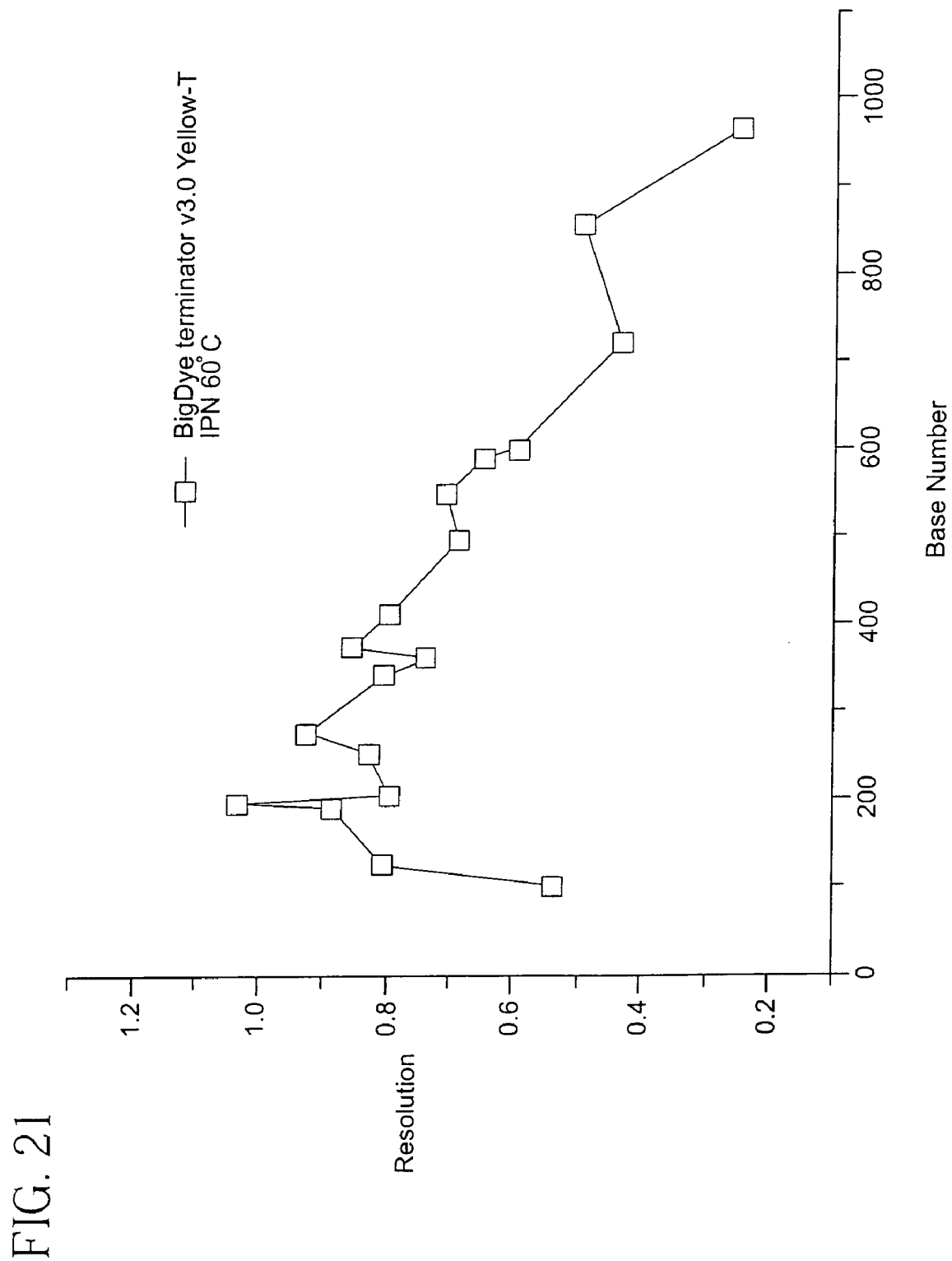

FIG. 21 shows the one-base resolution of yellow-T part of the electropherogram of DNA (BigDye Terminator v3.0), as shown in FIG. 20.

DETAILED DESCRIPTION OF THE INVENTION

The present invention relates to capillary electrophoresis separation media for the separation of charged macromolecules, and methods of making and using the same.

The separation medium of the present invention comprises a "quasi-interpenetrating network" (quasi-IPN) of polymer or copolymer chains. These chains interpenetrate one another, and are entangled within one another. In one embodiment, a quasi-IPN comprises linear polyacrylamide (LPA) chains and polydimethylacrylamide (PDMA) chains. In another embodiment, a quasi-IPN comprises a random copolymer of acrylamide (AM) and dimethylacrylamide (DMA) chains, and polydimethylacrylamide chains.

Chemical cross-linking is not required within the quasi-IPNs. Preferably, no chemical cross-linking occurs. However, due to varying experimental conditions, an insubstantial amount of chemical cross-linking may occur. For the purposes of this specification, an insubstantial amount of cross-linking is defined as less than about 5%, 2%, 1%, 0.5% or 0.2% of the polymer chains are chemically cross-linked to another polymer chain. Cross-linking agents are not used in the preparation of the quasi-IPNs.

Generally in the art, the term "interpenetrating network" is used to describe a polymeric structure containing at least two independent chemically cross-linked polymer networks which interpenetrate one another, but are not cross-linked to one another. Accordingly, a difference between IPNs as known in the art and the quasi-IPNs of the invention is that the quasi-IPNs constitute a single network having substantially no chemical cross-linking.

Each polymer (or copolymer) of the quasi-IPNs provides different desirable properties to separation media. For example, LPA is hydrophilic, and provides good separation results, such as good resolution, a long read length and a short run time. However, the inability of LPA to bind directly to the inner walls of capillary tubes results in an undesirable electro-osmotic flow during electrophoresis.

PDMA is less hydrophilic, and can dynamically coat the capillary inner walls, thus avoiding electro-osmotic flow. Also, PDMA inhibits the nonspecific adsorption of charged macromolecules (e.g., DNA fragments) by the wall.

By combining such two different polymers, LPA and PDMA, in a quasi-IPN, the present invention combines the desirable properties of each polymer into one separation medium.

In general, the compatibility of LPA and PDMA chains in a solvent can range from the chains being miscible with one another to being immiscible with one another. For the purposes of this specification, the LPA and PDMA chains are defined as miscible if they blend together, and are able to stay in solution indefinitely. The LPA and PDMA chains are defined as immiscible if they will eventually phase separate even when a highly entangled homogeneous solution of LPA and PDMA chains is achieved. The LPA and PDMA chains are partially immiscible if they exhibit a degree of miscibility that is between that of the miscible and immiscible polymer chains.

The miscibility of LPA and PDMA chains is affected by several factors, such as, for example, the total polymer concentration in a solvent, the molecular weights of the polymers, and the relative amounts of each type of polymer. The miscibility decreases as the total polymer concentration increases, and/or as the molecular weight of the polymers increases, and/or as the relative amount of PDMA increases in a solution where LPA is the major component.

A certain minimum total polymer concentration is required to obtain a suitable mesh size for a separation medium. Typically, in order to achieve a suitable mesh size for most sequencing separations, a total polymer concentration in the order of about 1.5 wt % or higher is required. When the relative amounts of the LPA and PDMA chains are comparable, and when their molecular weights are high, LPA and PDMA chains are partially immiscible with each other at a total polymer concentration of 1.5 wt %. However, by forming quasi-IPNs from the partially immiscible LPA chains and PDMA chains, these chains entangle and interpenetrate each other for at least as long as required to perform a separation of charged biomolecules.

The LPA and PDMA chains within a quasi-IPN are dissimilar, at least to the point that the polymer chains repel one another. Thus, the chains become extended beyond their normal conformations in solution. Consequently, the quasi-IPNs in solution have a lower weight to volume ratio than the sum of the weight to volume ratios of the constituent LPA chains and PDMA chains when not in the form of the quasi-IPNs. The more extended conformation effectively provides a better separation medium, and minimizes the amount of polymer material necessary to create a desirable mesh size.

The LPA and PDMA chains must be miscible to the point that the polymer chains remain entangled within one another at least as long as required to achieve separation of charged macromolecules. In this manner, when placed in a sequencing buffer medium, the quasi-IPN is in the form of a homogeneous gel-like solution.

Certain physical properties of the LPA chains, PDMA chains and quasi-IPNs can be determined. These properties include the molecular weight, polydispersity index, radius of gyration and hydrodynamic radius. Such properties can affect the separation results provided by a particular quasi-IPN. Depending upon a specific application of a quasi-IPN, these properties can be varied to optimize the separation results. These properties are discussed below.

The molecular weight of a single polymer chain is simply the molecular weight of a monomer multiplied by the number of monomers in the polymer chain. A polymer solution comprises a plurality of polymer chains having a variety of molecular weights. The molecular weight of a polymer in solution is characterized as an average of the molecular weights of the polymer chains in the solution. There are several manners in which to characterize the average molecular weight of a polymer in solution.

One way to characterize the molecular weight of a polymer in solution is by determining the "number average molecular weight" ($M_n$) of the polymer in solution. The number average is defined as the total weight of the polymer chains in a solution divided by the total number of chains in the solution. That is, $M_n = \Sigma n_i M_i / \Sigma n_i$, where $n_i$ is the number of chains in the solution with weight $M_i$.

Another manner in which to characterize the molecular weight of a polymer is by the "weight average molecular weight" ($M_w$). The weight average is defined as the sum of $n_i M_i^2$ divided by the sum of $n_i M_i$, where $n_i$ is the number of chains with mass $M_i$. That is, $M_w = \Sigma n_i M_i^2 / \Sigma n_i M_i$. The weight average molecular mass can be determined experimentally by using a static laser light scattering experiment.

The ratio $M_w/M_n$ is defined as the polydispersity index of a polymer. This index is a measure of the size distribution of chains of a polymer. The weight average molecular mass will always be bigger than the number average molecular mass for polydisperse materials. As the value of the index approaches one, the more similar in size are the polymer chains. As known by a skilled artisan, the polydispersity index can be estimated by using a numerical method, the CONTIN method (Provencher, *Comput. Phys. Commun.* 27:229 (1982)), in combination with dynamic light scattering measurements.

The radius of gyration ($R_g$) is a measure of the size of a polymer chain. It can be defined in terms of the distribution of distances ($r_i$) of each monomer of mass $m_i$ in a polymer chain from the center of gravity of the chain: $R_g^2 = \Sigma m_i r_i^2$. The radius of gyration of a polymer in solution can be determined experimentally by using a static laser light scattering experiment. The radius of gyration is measured below the overlap concentration.

Additionally, if two values of the radius of gyration ($R_g$) and the corresponding weight-average molecular weights ($M_w$) of a particular polymer in a solution are known, then the radius of gyration of the polymer in the same solution but with a different known $M_w$ can be approximated. The approximation is made by using the following formula: $R_g = k_g M_w^\alpha$, wherein $k_g$ is a constant. In a good solvent, as would be recognized by one skilled in the art, the exponent $\alpha$ is about 0.58.

A property related to the radius of gyration is the hydrodynamic radius ($R_h$). The hydrodynamic radius of a polymer molecule in solution is determined from a measurement of the mobility (in terms of the translational diffusion coefficient in dilute solution) of the molecule by dynamic light scattering experiments. The ratio of $R_g:R_h$ depends on polymer molecule conformation, as known by those skilled in the art.

The quasi-IPNs of the present invention cannot be prepared by simply mixing LPA with PDMA. Instead, specific synthetic methods are used to effect the entanglement and interpenetration of these polymer chains.

A preferred synthetic method for making the quasi-IPNs comprises forming a polymer network, or "main frame,"

from LPA, or from AM/DMA copolymer. For the purposes of the present invention, a main frame comprises LPA polymer molecules, or AM/DMA copolymer molecules, in a solvent wherein the solution has a concentration which is far above the overlap concentration (C*) of LPA, or of AM/DMA copolymer, for the particular solvent, as defined below.

The overlap concentration of a polymer in a solution is the lowest concentration at which the polymer molecules first intermesh and become entangled with each other. Accordingly, at the overlap concentration, the properties of a polymer solution are typically significantly altered. Individual polymer molecules exert a greater influence upon the movements of neighboring molecules at the overlap concentration than at more dilute concentrations. For example, the movement of polymer molecules becomes more restricted by neighboring molecules. Also, there is typically a sharp increase of viscosity of the solution.

The overlap concentration can be given in terms of various measurable properties of polymer solutions. For example, the overlap concentration of a polymer solution is typically estimated to be the reciprocal of the intrinsic viscosity ($[\eta]$) of the solution.

Also, the overlap concentration can be estimated in terms of the molecular weight (M) of a polymer in solution and radius of gyration ($R_g$) in accordance with the formula: $C^* \sim M/R_g^3$. The molecular weight and radius of gyration can be determined experimentally from light scattering experiments, as is well known in the art. B. Chu, "Laser Light Scattering: Basic Principles and Practice," $2^{nd}$ Edition, Academic Press, Boston (1991) pp. 343.

A LPA main frame is formed by polymerizing acrylamide monomers using any suitable polymerization method. Once the overlap concentration is reached in solution, a LPA main frame is formed. Examples of polymerization methods include inverse microemulsion polymerization; emulsifier-free polymerization; conventional and seeded emulsion polymerization; and dispersion and suspension polymerizations.

Polymerization methods which provide high molecular weight LPA, such as, for example, inverse microemulsion polymerization, are preferable. The process of inverse microemulsion polymerization is known in the art. An inverse microemulsion contains droplets of water in the nanometer size range, surrounded by oil molecules. Polymerization occurs within the water droplets triggered by an initiator, such as UV radiation or thermal initiators. Emulsifier-free polymerization also provides LPA molecules with high molecular weights.

LPA with a fairly narrow molecular weight distribution, i.e., a small polydispersity index, is preferred. Inverse microemulsion polymerization provides LPA with a small polydispersity index.

Throughout this specification, there are ranges defined by upper and lower boundaries. Each lower boundary can be combined with each upper boundary to define a range. The lower and upper boundaries should each be taken as a separate element.

The physical properties of the main frame LPA are preferably measured with LPA in a buffer solution. Examples of suitable buffers include Tris-TAPS-EDTA (TTE), Tris-Borate-EDTA (TBE) and Tris-glacial-Acetate-EDTA (TAE). The following physical properties of LPA were measured in a 1×TTE buffer solution. A 1×TTE solution comprises 50 mM Tris; 50 mM TAPS; and 2.0 mM EDTA.

The overlap concentration depends on the molecular weight of the LPA, and the solvent. The range of the overlap concentration of LPA in 1×TTE has a lower boundary of approximately $5.0 \times 10^{-4}$ g/ml. Examples of other lower boundaries include $5.0 \times 10^{-3}$ and $9 \times 10^{-3}$ g/ml. The range of the overlap concentration of LPA in 1×TTE has an upper boundary of approximately $4.0 \times 10^{-2}$ g/ml. Examples of other lower boundaries include $1.0 \times 10^{-2}$ and $2.0 \times 10^{-2}$ g/ml. A specific example of an overlap concentration is approximately $1.2 \times 10^{-3}$ g/ml.

Preferably, the range of the weight-average molecular weight of the LPA chains has a lower boundary of approximately 0.05 million g/mole. Examples of other lower boundaries include approximately 0.1 million, 0.3 million, 1 million, 4 million, 6 million, and 7 million g/mole.

Preferably, the range of the weight-average molecular weight of the LPA chains has an upper boundary of approximately 25 million g/mole. Examples of other upper boundaries include approximately 8 million, 10 million and 15 million g/mole. An example of an LPA weight-average molecular weight is 7.6 million g/mole.

Preferably, the range of the polydispersity index of the LPA chains is narrow. For example, preferably the range of the polydispersity index has a lower boundary of approximately 1.01. Examples of other lower boundaries include approximately 1.02, 1.05 and 1.1.

Preferably, the range of the polydispersity index has an upper boundary of approximately 1.8. Examples of other upper boundaries include approximately 1.3, 1.5 and 1.6. An example of a polydispersity index for LPA is 1.3.

Preferably, the range of the radius of gyration of a LPA in buffer solution has a lower boundary of approximately 10 nm. Examples of other lower boundaries include approximately 15 nm, 28 nm, 55 nm, 125 nm, 150 nm and 165 mm.

Preferably, the range of the radius of gyration of a LPA in buffer solution has an upper boundary of approximately 350 nm. Examples of other upper boundaries include approximately 180 nm, 210 nm and 250 nm. An example of an LPA radius of gyration is approximately 180 nm.

The range of the hydrodynamic radius of LPA in solution follows the range of $R_g$ for LPA in a good solvent, as would be known by a skilled artisan. An example of the hydrodynamic radius of LPA in solution is approximately 81 nm.

Dimethylacrylamide monomers are polymerized within the LPA main frame. The polymerization of dimethylacrylamide monomers can take place by any suitable method, such as, for example, by the same methods described above for preparing LPA. Radical polymerization is preferred.

Preferably, the range of the weight-average molecular weight of the quasi-interpenetrating network formed from LPA and PDMA chains has a lower boundary of approximately a few hundred thousand. Examples of other lower boundaries include approximately 0.1 million, 0.5 million, 2 million, and 6 million g/mole.

Preferably, the range of the weight-average molecular weight of the quasi-interpenetrating network formed from LPA and PDMA chains has an upper boundary of approximately 20 million g/mole. Examples of other upper boundaries include approximately 7 million, 10 million and 16 million g/mole. A specific example of a weight-average molecular weight of a LPA/PDMA quasi-interpenetrating network is approximately 6.4 million g/mole.

Preferably, a quasi-interpenetrating network has constituent polymers wherein the range of the polydispersity index for each constituent polymer has a lower boundary of approximately 1. Examples of other lower boundaries include approximately 1.05 and 1.1.

Preferably, a quasi-interpenetrating network has constituent polymers wherein the range of the polydispersity index for each constituent polymer has an upper boundary of approximately 1.8. Examples of other upper boundaries include approximately 1.3, and 1.5.

In a preferred embodiment, the range of the radii of gyration of the LPA and the PDMA within a quasi-interpenetrating network has a lower boundary of approximately less than 10 nm. Examples of other lower boundaries include approximately 15 nm, 40 nm, 80 nm and 150 nm.

Preferably, the range of the radii of gyration of the LPA and the PDMA within a quasi-interpenetrating network has an upper boundary of approximately 320 nm. Examples of other upper boundaries include approximately 165 mm, 210 nm and 280 nm. An example of a radius of gyration for the quasi-IPN is about 153 nm.

A quasi-interpenetrating network formed from LPA and PDMA chains has an overlap concentration in 1×TTE of approximately $5\times10^{-4}$ to $3.0\times10^{-2}$ g/ml. A specific example of an overlap concentration is approximately $5.5\times10^{-3}$ g/ml.

The ratio of the amount of LPA to the amount of PDMA is in the range of approximately 10:1 to 15:1 when the weight molecular weight range of the LPA is approximately from 6 million to 7 million g/mole.

The formation of a quasi-interpenetrating network by first providing an LPA main frame, allows the mixing of LPA and PDMA at high polymer concentrations, thus enabling the preparation of a homogenous gel-like solution. Such a method is applicable even if the LPA and PDMA become immiscible at higher concentrations and exhibit a macroscopic phase separation in due course.

At high LPA concentrations, such as, for example, greater than about $4.0\times10^{-2}$ g/ml, PDMA and LPA become essentially immiscible. However, in one embodiment of the present invention, quasi-IPNs are formed from random copolymers of AM and DMA, and the homopolymer PDMA. The random copolymers (of AM/DMA) allow for the formation of quasi-IPNs (with PDMA) at high total polymer concentrations without phase separation.

In this embodiment, acrylamide and dimethylacrylamide monomers are polymerized within a buffer solution using any suitable polymerization method. Radical polymerization is the preferred method of polymerization. A random copolymer main frame is formed from AM and DMA random copolymer chains once overlap concentration is reached in the buffer solution. The random copolymer has an overlap concentration of approximately $3\times10^{-3}$ to $4.0\times10^{-2}$ g/ml in a buffer solution. Another lower boundary of this range is $5\times10^{-3}$ g/ml in a buffer solution. Another upper boundary of this range is $3.0\times10^{-2}$ g/ml in a buffer solution. A specific example of an overlap concentration is approximately $1\times10^{-2}$ g/ml in a buffer solution, such as 1×TTE.

Preferably, the range of the weight average molecular weight of the AM/DMA random copolymer chains making up a main frame has a lower boundary of approximately 0.05 million g/mole. Examples of other lower boundaries include approximately 0.1 million and 0.3 million g/mole.

Preferably, the range of the weight average molecular weight of the AM/DMA random copolymer chains making up a main frame has an upper boundary of approximately 2 million g/mole. Examples of other upper boundaries include 0.5 million and 1 million g/mole.

Preferably, the range of the ratio of the amount of AM to the amount of DMA in the quasi-IPN has a lower boundary of approximately 5:1. Examples of other lower boundaries include 10:1, and 20:1. Preferably, the range of the ratio of the amount of AM to the amount of DMA in the quasi-IPN has an upper boundary of approximately 50:1. Examples of other upper boundaries include 30:1, and 40:1.

Preferably, the radius of gyration of an AM/DMA random copolymer in buffer solution is approximately between 10 nm to 80 nm. Examples of lower boundaries of this range are approximately 10 run, 15 nm, and 30 nm. Examples of upper boundaries of this range are approximately 40 nm, 55 nm, and 80 mm. Preferably, the random copolymer has a polydispersity index of from about 1.1 to 2.

The PDMA chains are prepared by polymerizing DMA in the presence of the random copolymer main frame by any suitable polymerization method. Radical polymerization is the preferred method of polymerization.

Preferably, the range of weight-average molecular weight of the constituent polymer and copolymer of a quasi-IPN formed from the AM/DMA copolymer and PDMA polymer has a lower boundary of approximately 0.1 million g/mole. Other examples of lower boundaries include approximately 0.5 million and 0.8 million g/mole.

Preferably, the range of weight-average molecular weight of the constituent polymer and copolymer of a quasi-IPN formed from the AM/DMA copolymer and PDMA polymer has an upper boundary of over 2 million g/mole. Other examples of upper boundaries include approximately 1 million and 2 million g/mole.

Preferably, the range of the radii of gyration of the polymer and copolymer has a lower boundary of approximately 15 mm. Other examples of lower boundaries include approximately 40 and 50 nm.

Preferably, the range of the radii of gyration of the polymer and copolymer has an upper boundary of approximately 80 nm. Other examples of upper boundaries include approximately 55 and 65 mm.

Preferably, the random copolymer and the PDMA polymer have a polydispersity index of from about 1.1 to 2. A specific example of a polydispersity index is about 1.6. It is noted that the presence of two types of polymers, each with its own polydispersity index, broadens the polydispersity index of the quasi-IPN, especially when the two polymers have very different molecular weights.

In an alternative embodiment of the present invention, a method of making a quasi-interpenetrating network is provided by a solution-mixing method. In this method, the polymers and/or copolymers forming the quasi-IPN are required to be compatible with one another in the homogeneous one-phase region of the polymer mixture.

In this method, separate solutions of LPA and PDMA are provided. One of these solutions, preferably the PDMA solution, is more dilute than the LPA solution. Examples of solvents for these solutions include water and buffer solutions. Examples of suitable buffer solutions include Tris-TAPS-EDTA (TTE), Tris-Borate-EDTA (TBE), and Tris-glacial-Acetate-EDTA (TAE). The two polymers are thoroughly mixed, permitting the polymer chains to interpenetrate. It is not efficient to mix two polymer solutions with both solutions far above the overlap concentration(s).

The LPA solution is approximately one to fifteen times as concentrated as the PDMA solution. In the embodiment where the LPA and PDMA are of equal concentrations, the volume of the PDMA is decreased accordingly. The volume of the LPA solution is approximately one to fifty times as great as the volume of the PDMA solution. In the embodiment where the LPA and PDMA are of equal volumes, the concentration of the PDMA is decreased accordingly.

The PDMA solution is added to the LPA solution in a stepwise fashion. After each addition, the resultant solution is thoroughly mixed. For the purposes of this specification, a stepwise fashion means that only a portion of the total amount of the PDMA solution is added to the LPA solution, and after each portion is added, the resulting solution is mixed thoroughly. Examples of portions include one third of the PDMA solution, one fourth of the PDMA solution, one fifth of the PDMA solution, one tenth of the PDMA solution, and one twentieth of the PDMA solution.

In this embodiment, the range of the weight-average molecular weight of the LPA preferably has a lower boundary of approximately 0.05 million g/mole. Examples of other lower boundaries include approximately 0.1 million, 0.3 million, and 1 million g/mole.

The range of the weight-average molecular weight of the LPA preferably has an upper boundary of approximately 25 million g/mole (or as high as can be achieved). Examples of other upper boundaries include approximately 4 million, 6 million, 7 million, 8 million, 10 million, 15 million and 20 million. An example of an LPA weight-average molecular weight is 6.4 million.

The LPA is dissolved in an aqueous solution such as water or a buffer solution. Examples of suitable buffers include TTE, TBE and TAE. An example of a preferred buffer solution is a 1×TTE+7M Urea buffer. The range of the concentration of the LPA/buffer solution, e.g., a LPA/TTE solution, can preferably have a lower boundary of about 1.0% g/ml. Other examples of lower boundaries include 4.0% and 6.0% g/ml. The range of the concentration of the LPA/buffer solution, e.g., a LPA/TTE solution, can preferably have an upper boundary of about 12.0% g/ml. Other examples of upper boundaries include 8.0% and 10.0% g/ml. As the concentration is increased, the mesh size of the quasi-IPN is decreased. An example of the concentration of an LPA/TTE solution is approximately 2.6% g/ml.

The range of the weight-average molecular weight of the PDMA preferably has a lower boundary of approximately 100,000 g/mole. Examples of other lower boundaries include approximately 300,000 and 500,000 g/mole. The range of the weight-average molecular weight of the PDMA preferably has an upper boundary of approximately 25 million g/mole. Examples of other upper boundaries include approximately 1 million, 3 million and 10 million g/mole. An example of a PDMA weight-average molecular weight is 470,000 g/mole.

The PDMA is dissolved in an aqueous solution such as water or a buffer solution. Examples of suitable buffers include TTE, TBE and TAE. An example of a preferred buffer solution is a 1×TTE+7M Urea buffer. The concentration of the PDMA/buffer solution, e.g., a PDMA/TTE solution, can preferably range from about 0.1% g/ml to 3.0% g/ml. An example of the concentration of a PDMA/TTE solution is approximately 1.6% g/ml.

The quasi-IPN which results from this method comprises approximately 3.0 to 15.0 times as much of the LPA as the PDMA. For example, the quasi-IPN can comprise about 85 wt % LPA and 15 wt % PDMA.

A solution-mixing method can also be used to form quasi-IPNs of AM/DMA random copolymer and PDMA. Separate buffer solutions of AM/DMA random copolymer and PDMA are provided. Examples of suitable buffer solutions include TTE, TBE and TAE. One of these solutions, preferably the PDMA solution, is more dilute than the random copolymer solution. The polymer and copolymer chains are thoroughly mixed, permitting the chains to interpenetrate.

The random copolymer of AM/DMA solution is approximately one to fifty times as concentrated as the PDMA solution. In the embodiment where the copolymer and PDMA are of equal concentrations, the volume of the PDMA is decreased accordingly. The volume of the random copolymer solution is approximately one to twenty times as great as the volume of the PDMA solution. In the embodiment where the copolymer and PDMA are of equal volumes, the concentration of the PDMA is decreased accordingly. The copolymer/buffer solution has a concentration of approximately 5.0 to 20.0% g/ml, preferably approximately 7% to 12% g/ml. The PDMA/buffer solution has a concentration of approximately 0.1 to 1.0% g/ml.

The PDMA solution is added to the random copolymer solution in a stepwise fashion, as described above for the LPA and PDMA.

In this embodiment, the range of the weight-average molecular weight of the random copolymer preferably has a lower boundary of approximately 0.05 million g/mole. Examples of other lower boundaries include approximately 0.1 million, and 0.3 million g/mole. The range of the weight-average molecular weight of the random copolymer preferably has an upper boundary of approximately 2 million g/mole (or as high as can be achieved, but within an acceptable viscosity range). Examples of other upper boundaries include approximately 0.5 million, 1 million and 1.5 million g/mole.

The range of the weight-average molecular weight of the PDMA preferably has a lower boundary of about 50,000 g/mole. Examples of other lower boundaries include 100,000 and 200,000 g/mole. The range of the weight-average molecular weight of the PDMA has an upper boundary of about 25 million g/mole. Examples of other upper boundary include 500,000; 1 million, 3 million, 5 million and 10 million.

The quasi-IPN which results from this method comprises approximately up to about 50 times as much random copolymer as the PDMA.

The quasi-IPNs formed from all the embodiments of the present invention can be used as a medium for the separation of charged molecular species, e.g., for capillary electrophoresis or DNA/protein analysis on a chip. Examples of biomolecules include nucleic acid molecules and proteins.

For a given polymer, aside from instrumentation variables, the optimization of separation conditions for capillary electrophoresis in DNA sequencing analysis depends on three primary factors: the polymer concentration, the sample injection amount and the electric field strength. The concentration of the polymer in the separation medium affects the resolution, the run time and the read length. Higher concentrations provide higher resolution, while lower concentrations provide lower viscosity, faster separation and longer read length. The optimum concentration would have sufficient resolution at the lowest possible concentration. The amount of sample injected affects the resolution as well as the signal to noise ratio. For optimum results, the injection amount should be kept to a minimum in order to provide high resolution and a sufficiently high signal to noise ratio. The electrical field strength should be moderately high, for example about 150 V/cm. Higher electric field strengths provide faster separation and higher resolution for smaller fragments. However, if the electric field strength is too high, larger fragments will have lower resolution and the read length will be shorter.

As a DNA separation medium, the quasi-IPNs successfully combine the dynamic coating ability of PDMA and the hydrophilicity of LPA. Also, due to the partial incompatibility of these two polymer systems, both LPA and PDMA chains are expanded beyond their natural conformation. Such expansion enhances the efficiency of the quasi-IPN as a separation medium, and minimizes the amount of polymer material necessary to achieve the desired mesh size. Efficient separation resolution is obtained by using the bare capillaries without additional polymer coating steps.

The performance of the quasi-IPNs comprising LPA and PDMA as a separation medium is affected by several variables. For example, as described above, the molecular weight of LPA, together with its molecular weight distribution, plays an important role in DNA sequencing analysis. Higher LPA molecular weights with narrower molecular weight distributions show better resolution and more stable separation capability.

Additionally, the ratio of the LPA to the PDMA, in relation to the molecular weight of the LPA, affects separation results. For each weight molecular weight range of the LPA, there is a LPA:PDMA ratio which optimizes the separation results. For instance, for an LPA with a weight-average molecular weight of approximately 6 million to 7 million, an LPA:PDMA ratio in the range of approximately 10:1 to 15:1 would be optimal. Any further increase in the amount of PDMA may result in microphase separation of the polymer system even at fairly low overall polymer concentrations, and adversely affect separation results.

Under optimal running conditions, as shown in FIGS. 20 and 21, one base resolution of 0.50 up to 858 bases and ~0.3 up to 1000 bases have been achieved in about 35 min at 60° C. by using a 2.0 w/v % of LPA and PDMA with the LPA:PDMA ratio of 10:1 as the separation medium. It is noted that the overall LPA and PDMA molecular weights could be higher, resulting in further improvements in performance.

The quasi-IPN can be easily removed from the capillary because the polymers are not chemically bound by cross-links. Thus, these polymer solutions can be replaced after each electrophoresis run if necessary. Such a feature makes the separation media of the invention well suited for automated capillary electrophoresis.

The key points to producing a quasi-IPNs are (1) to select the most efficient separation polymer, (2) to mix the separation polymer homogeneously with another polymer that can dynamically coat the inner wall of the capillary tubing or separation chip, and (3) to have each of the polymers above its own overlap concentration. Thus, the main-frame polymer should have as high a polymer ratio in the total polymer concentration (i.e., the concentration as determined by the required mesh size) as the system will permit. The coating polymer should be present in as little amount as possible, but in an amount which is above its overlap concentration. For separation media used in sequencing analysis, the requirements can be satisfied easily as the total polymer concentration is relatively low. For DNA analysis on a chip, i.e., for rapid analysis using short channel lengths and smaller charged molecular sizes, the mesh sizes are smaller and the total polymer concentration required becomes high. At such concentrations, phase separation will occur, even for LPA and PDMA which are miscible at low polymer concentrations. For this reason, the compatibility of the polymers for quasi-IPNs at high total polymer concentrations is adjusted by using a random copolymer of AM/DMA where the DMA content in the copolymer is adjusted so that the PDMA becomes miscible with the random copolymer of AM/DMA in the desired concentration range. The quasi-IPN separation medium should be thoroughly mixed by the methods of the invention, i.e., by in situ polymerization of one polymer in another main-frame polymer, or by a step-wise procedure. The mixed solution should be homogeneous on a molecular scale, but not depend on visual observation, in order to achieve reproducible results.

EXAMPLES

Example 1

Materials and Methods

Ammonium persulfate (APS), tris-(hydroxymethyl)aminomethane (Tris), N-tris(hydroxymethyl) methyl-3-aminopropanesulfonec acid (TAPS), ethylenediaminetetra-acetic acid (EDTA) and acrylamide were purchased from Sigma (St. Louis, Mo., USA). Acrylamide was recrystallized twice from chloroform. Bis(2-ethylhexyl) sulfosuccinate (AOT, Fluka) was desalted by dissolution in methanol, followed by filtration. The filtrate was then shaken with petroleum ether to extract organic impurities. This was followed by solvent removal and drying of precipitate at 50° C. under vacuum and in the presence of phosphorus pentoxide. Azobisisobutyronitrile (AIBN) was recrystallized twice from ethanol. N,N, N',N'-tetramethylenediamine (TEMED) was purchased from Fisher Scientific (Pittsburgh, Pa.). DMA was purchased from Polysciences (Warrington, Pa., USA) and distilled at 80° C./20 mmHg before use. Both cathode and anode running buffer was 1×TTE (50 mM Tris/50 mM TAPS/2.0 mM EDTA). Cathode running buffer also contained ~7M urea, the same as in the separation matrix. The water used in all reactions and solutions was deionized to 18.2 MΩ with a Milli-Q water purification system (Millipore, Bedford, Mass., USA).

Preparation of LPA Using Inverse Microemulsion Polymerization

A typical recipe for the preparation of LPA is listed in Table 1. The polymerization was carried out at 45° C., by using a stirrer speed of 350 rpm under a nitrogen atmosphere. All the ingredients except AIBN solution were placed in a 150 ml four-neck round bottom flask equipped with a mechanical stirrer, a reflux condenser, a thermometer, a nitrogen inlet tube, and a feeding funnel. The reaction system was purged with nitrogen for 1 h prior to the addition of the AIBN solution. After polymerization, polyacrylamide was recovered by precipitation in an excess of acetone, followed by successive washing, filtered and dried under vacuum at 50° C.

TABLE 1

Recipes for the polymerization[a] of polyacrylamide

| Sample | AOT (g) | AM (g) | Water (g) | Toluene (g) | AIBN (g) | $M_v \times 10^{-6}$ |
|---|---|---|---|---|---|---|
| [b]A-0 | 0 | 6.87 | 7.65 | 68.44 | 0.0035 | 9.96 |
| A-1 | 17.04 | 6.87 | 7.65 | 68.44 | 0.0035 | 4.53 |
| A-2 | 16.50 | 7.07 | 7.65 | 68.44 | 0.0035 | 6.41 |
| A-3 | 16.50 | 7.87 | 7.65 | 68.44 | 0.0035 | 7.69 |
| A-4 | 16.50 | 8.37 | 7.65 | 68.44 | 0.0035 | 9.91 |

[a]Polymerization time: 2 h
[b]Polymerization temperature: 60° C.

Preparation of Quasi-IPNs

Dissolved the LPA into water in a 100 ml four-neck round bottom flask equipped with a mechanical stirrer, a reflux condenser, a thermometer, a nitrogen inlet tube, and a feeding funnel. After addition of DMA, the reaction system was purged with nitrogen for 1 h prior to the addition of APS and TEMED. After polymerization, the quasi-IPNs were recovered by precipitation in an excess of acetone, followed by successive washing, filtered and dried under vacuum at 50° C. A typical recipe for the preparation of the quasi-IPNs based on LPA and PDMA is listed in Table 2.

TABLE 2

Recipes for preparation of quasi-IPNs based on acrylamide and dimethylacrylamide

| Sample | A-0 (g) | A-1 (g) | A-2 (g) | A-3 (g) | A-4 (g) | $H_2O$ (g) | DMA (g) | APS | TEMED (µl) | [LPA]: [PDMA] |
|---|---|---|---|---|---|---|---|---|---|---|
| D0 | 0.5 | | | | | 50 | 0.1 | 0.0021 | 3 | 11.0 |
| D1 | | 0.5 | | | | 50 | 0.1 | 0.0021 | 3 | 10.8 |
| D2-1 | | | 0.5 | | | 50 | 0.42 | 0.0021 | 3 | 1.62 |
| D2-2 | | | 0.5 | | | 50 | 0.31 | 0.0021 | 3 | 3.33 |
| D2-3 | | | 0.5 | | | 50 | 0.21 | 0.0021 | 3 | 6.33 |
| D2-4 | | | 0.5 | | | 50 | 0.1 | 0.0021 | 3 | 10.9 |
| D3 | | | | 0.5 | | 50 | 0.1 | 0.0021 | 3 | 11.1 |
| D4 | | | | | 0.5 | 50 | 0.1 | 0.0021 | 3 | 11.2 |

Polymerization temperature: 0° C.
Polymerization time: 24 h

Characterization of Polymers

The intrinsic viscosities [η] in 1M $NaNO_3$ aqueous solution of LPA were measured using an Ubbelohde viscometer, and calculated by extrapolation to zero concentration at 30° C. The viscosity-average molecular weight $M_v$ (Table 1) of synthesized LPA was determined by applying the following equation. $[\eta]=3.73\times10^{-2}M_v^{0.66}$ $cm^3/g$.

The composition of the quasi-IPNs was determined by AC250-$^1$H-NMR with $D_2O$ as the solvent. The LPA to PDMA ratio (Table 2) in the quasi-IPNs was estimated from the integral peak area ratio of the peaks located at 2.1 and 2.6 ppm.

Sequencing Chemistry

Sequencing reactions were performed using an ABI PRISM™ Dye Primer (−21 M13 forward) Cycle Sequencing Ready Reaction Kit with AmpliTaq® DNA Polymerase, FS (PE Biosystems/Perkin-Elmer, Foster City, Calif., USA) on a pGEM3Zf(+) double-stranded template. Single dye-labeled sequencing reactions were performed using the FAM labeled primer and the C-termination mix. The DNA sequencing was carried out with a GeneAmp PCR System 2400 (PE Biosystems/Perkin-Elmer) using the following cycling conditions: 15 cycles of 10 s at 95° C., 5 s at 50° C. and 1 min at 70° C., followed by 15 cycles of 10 seconds at 95° C. and 1 minute at 70° C. The reaction products were purified by ethanol precipitation followed by two washes with 95% and 75% v/v ethanol and resuspended in 20 µl of deionized formamide.

Laser-Induced Fluorescence Detection

An Argon ion laser was used to generate an excitation beam at λ=488 nm and an incident power of about 5 mW. The laser beam was focused by a lens with a 25 cm focal length, reflected by a dichroic mirror (550DRLP; Omega Optical, Brattleboro, Vt.), and then focused again by using a 10× objective to a spot within the separation channel. The fluorescence light, after the dichroic mirror, was filtered by a bandpass filter (530DF30, Omega Optical, Brattleboro, Vt.) before entering the photomultiplier tube (PMT) (Hamamatsu R928, Hamamatsu Corporation, Bridgewater, N.J.). In order to get images of the capillary, a charge coupled device (CCD) camera (SONY SSC-M350, SONY Corporation, New York, N.Y.) was also coupled to the setup. A white light beam from the illuminator on the microscope illuminated the capillary. It was then focused by the objective, reflected by a slide in-and-out mirror, magnified by a Zoom 6000 System (D. 0 Industries, Rochester, N.Y.) and then detected by the CCD camera. The microscope a (Karl Zeiss, Melville, N.Y.) and the CCD camera provided a means to achieve good optical quality and to obtain fast alignment.

CE Procedures

1. For Laboratory-Built CE Apparatus

Fused-silica capillaries (Polymicro Technologies, Phoenix Ariz.) with ID/OD of 75/365 µm were used. A detection window was opened at 8 cm from the anode end by stripping off the polyimide coating with a razor blade. A capillary was simply washed with 1M HCl for 10 min. The separation medium was filled into the capillary tubing by using gas-tight syringe. Before each electrophoresis run, the capillary column was conditioned under an electric field strength of 300 V/cm until the current became stable (generally about 10 min). The DNA sample was electrokinetically injected into the capillary. The specific injection conditions, specific lengths and electrophoresic conditions, are listed in the figure captions.

2. For ABI-310

Similar procedure as (1); but follow the common practice of ABI procedure.

Example 2

Variables

Effects of Running Conditions

Running conditions, such as DNA injection width, effective column length and running electric field strength, greatly affect the performance of the quasi-IPNs in DNA separations. For comparative purposes, the resolutions (R) of selected DNA fragments were calculated according to the following equation: $R=2(t_2-t_1)/[1.699(w_2+w_1)]$, with t and w being the migration time and the full peak width at half maximal height, respectively.

In CE, the DNA sample is typically introduced into the column by electrokinetic injection. The initial DNA bandwidth or the amount of DNA introduced is controlled by adjusting the injection voltage and injection time interval.

FIG. 14 shows the change in the resolution at different DNA injection voltages using the quasi-IPNs of Example 1. By keeping the injection time intervals (10 s) constant, the separation resolution of base fragments with lengths of 103/104, 158/159, 186/187, 216/217, 280/281, 310/311, 357/358, 411/413, 716/720 and 833/836 under injection voltages of 25 v/cm, 75 v/cm, and 100 v/cm were calculated by using equation 2 and plotted against fragment length in FIG. 14 (the resolution of 411/413 pair was divided by 2, 716/720 pair was divided by 4, and 833/836 pair was divided by 3). An injection voltage at 75 V/cm showed the best resolution when compared with 100 V/cm and 25 V/cm. A higher injection voltage (above 75 V/cm) not only increased the initial DNA bandwidth, but also induced a tail in front of the peaks. Such a phenomenon is attributed to the over accumulation of DNA fragments at the interface between the sample buffer and the separation medium. High injection voltage and long injection time would introduce some DNA fragments into the separation medium before the running voltage was added. The increased bandwidth and distorted peak shape could lead to deterioration in the separation. Lower injection voltage was able to shorten the initial bandwidth and thus could, enhance the resolution. However, it would decrease the signal-to-noise ratio if the voltage were too low. Injection time intervals could affect DNA separation in a similar way as injection voltage.

At 75 V/cm, injection for 10 s showed the best result (data not shown). Injection voltage and injection time intervals are closely related to the initial DNA bandwidth. An optimal combination exists when other running conditions, such as column length, temperature, and running electric field strength, are kept constant.

Column length is another parameter having a great effect on DNA separation. FIG. 15 shows the change in resolution at an effective column length of 40 cm and of 35 cm. A length of 40-cm has better resolution than that of 35-cm. In DNA sequencing analysis by CE, the column length ranging from 13 cm to 60 cm has been employed with different separation media. Generally, a minimum column length exists; below which satisfactory separation cannot be achieved; longer column length usually produces longer DNA read length but a lower run time; fast separation could be fulfilled by decreasing column length with a loss of DNA read length and resolution.

Running electric field strength affects the DNA sequencing in terms of speed, read length and resolution. FIG. 16 shows the electropherogram of pGEM3Zf (+) (C-mix) after 581 bases at a running electric field strength of 200 V/cm and 150 V/cm. A lower running electric filed strength (150 V/cm) produced longer DNA read length, better resolution and longer migration time than that of a higher one (200V/cm).

Temperature affects DNA separation. Generally, an appropriate increase in the column temperature (below 50° C.) results in an increase in the efficiency and separation speed. It also helps in the separation of large DNA fragments. Very similar results were observed when quasi-IPN of LPA and PDMA were used as the DNA separation medium (data not shown).

Effect of LPA to PDMA Ratio

FIG. 17 shows the separations of DNA sequencing sample by using quasi-IPNs with LPA to PDMA ratio of 1.62:1, 3.33:1, 6.33:1, and 10.9:1 as the separation media. LPA with a molecular weight of $6.4 \times 10^6$ as a DNA separation medium showed very poor results in a non-coated capillary, as shown in FIG. 17a. The formation of a quasi-IPN by adding a very small amount of PDMA significantly improved the results, as shown in FIG. 17e, where the LPA to PDMA ratio was 10.89:1. However, further increase in the PDMA amount deteriorated the separation results. As shown in FIG. 17b–d, as the LPA to PDMA ratio was decreased from 6.33:1 to 1.62:1, the separation resolution correspondingly decreased.

In FIG. 17, the molecular weight of LPA is very high ($6.4 \times 10^6$ g/mole). The formation of quasi-IPN with a small amount of PDMA (LPA: PDMA being 10.9:1) optimized the network without phase separation. Moreover, the PDMA provided the dynamic coating strong enough to suppress the electro-osmosis. An increase in the PDMA amount (LPA: PDMA being 6.33:1) led to worse separation results. Also, a further increase in the PDMA amount induces microphase separation which ruins the performance of the quasi-IPNs, as seen in FIGS. 17b and c.

Effect of LPA Molecular Weight

To develop a quasi-IPN suitable for DNA sequencing analysis, the highest possible molecular weight LPA was used to form the main frame, followed by the polymerization of a small amount of PDMA monomers to optimize the quasi-IPN formation and to provide the dynamic coating ability. FIG. 18 shows the effect of LPA molecular weight on the DNA separation. While keeping the LPA:PDMA ratio almost constant and low (below 10:1 to maintain the compatibility of LPA and PDMA), the higher the molecular weight of LPA the better the resolution and the longer the read length. The larger size LPA formed the main frame of the quasi-IPN providing almost all the sieving power. The presence of interpenetrating PDMA chains expands the LPA chains and, makes the separation medium more effective.

Effect of LPA Molecular Weight Distribution

Figure 19A:
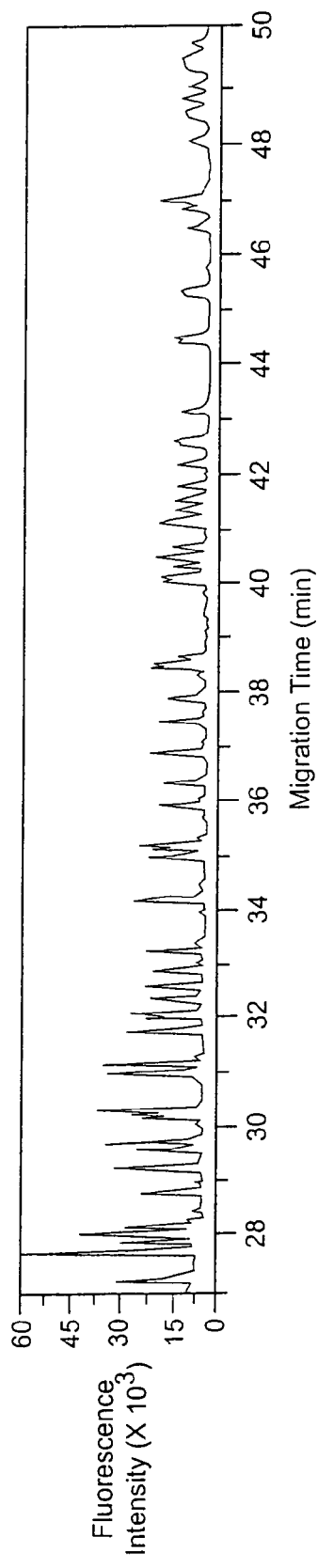
Figure 19B:
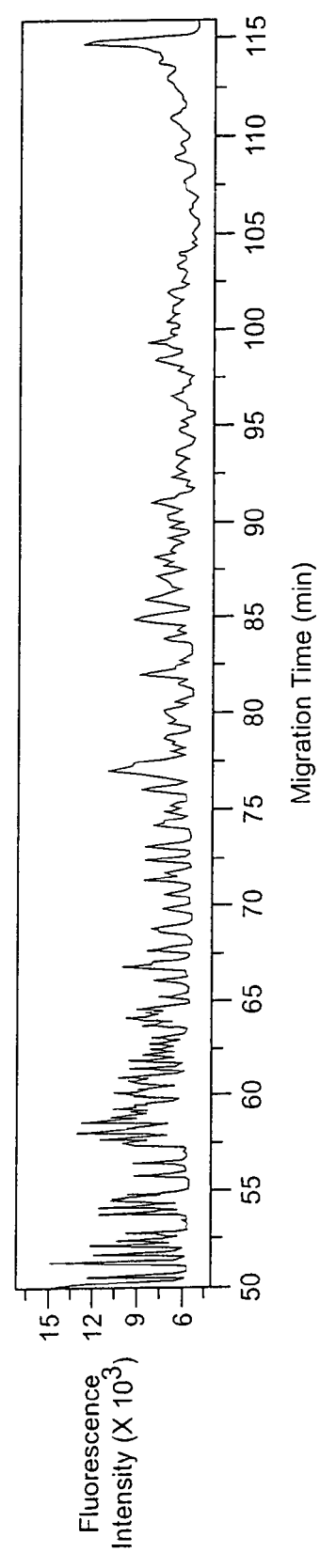
Figure 19C:
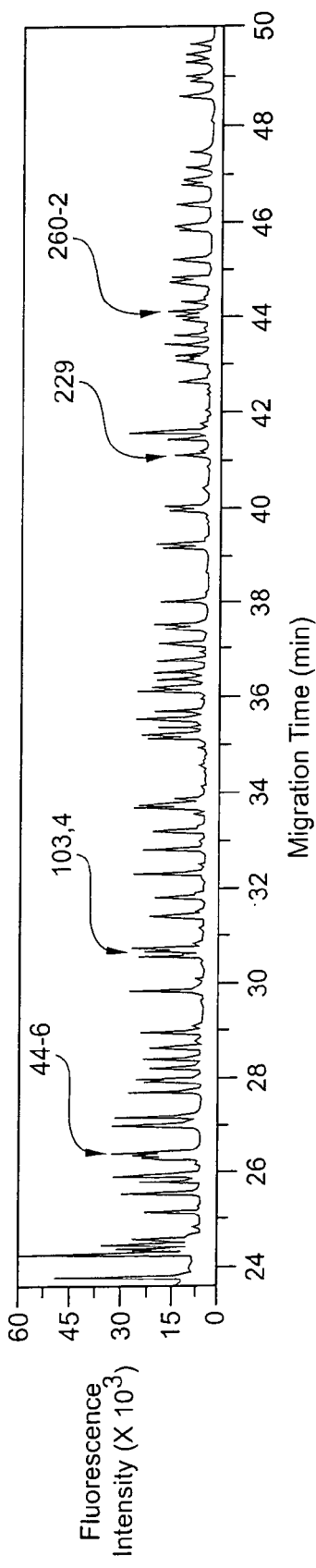
Figure 19D:
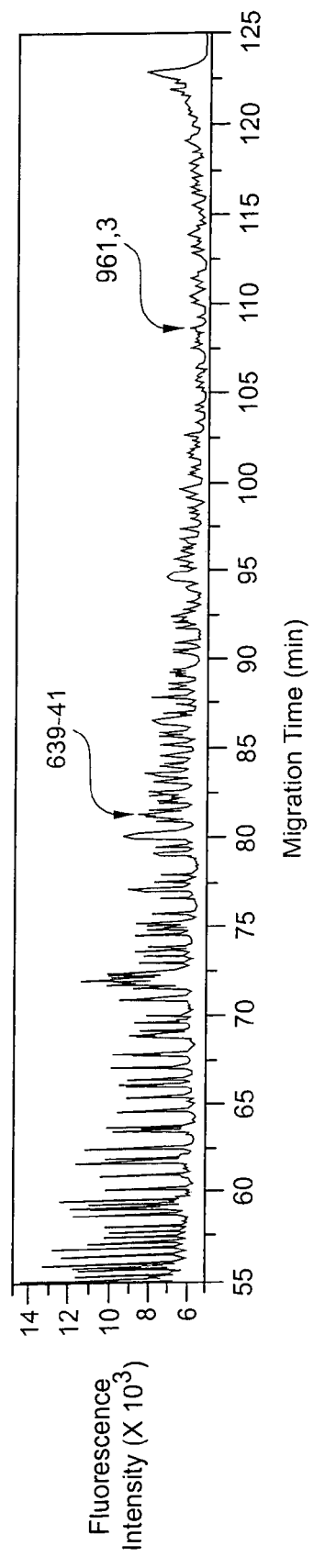

As shown in FIG. 18, higher LPA molecular weight in quasi-IPNs led to better resolution and longer DNA read length. In order to increase the molecular weight of LPA, different synthetic methods can be used. In one method, an emulsifier-free scheme is used to polymerize LPA (Sample AO, Table 1). In another method, inverse microemulsion polymerization is used to polymerize LPA (Sample A4, Table 1). High molecular weight LPA with fractions above 9 million was successfully synthesized by both methods. Such LPA was used to form a quasi-IPN with similar amounts of PDMA. Their performance on DNA separation is shown in FIG. 19. The LPA synthesized by inverse microemulsion polymerization showed much better separation after forming quasi-IPN with PDMA (FIG. 19b). All the other conditions, such as LPA molecular weight, LPA: PDMA ratio and procedures to form quasi-IPN, were almost the same.

DNA Sequencing Under Optimal Conditions

To increase the throughput of DNA separation, fast separation with longer read length is a practical approach. The following running conditions were employed: 34 cm effective column lengths, running voltage at 225 V/cm, DNA injection at 75 V/cm for 8 s, and 45° C. The quasi-IPN had the following parameters: 2.5 w/v % ($M_v$ of LPA is $4.53 \times 10^6$ g/mole) with LPA/PDMA ratio of 10.81:1. The electropherogram of C-terminated single dye labeled DNA sequencing fragments generated on the pGEM-3Zf(+) template by using Fam-labeled-21 M13 primer is shown in FIG. 15. One base resolution of 0.63 up to 617 bases and 0.3 up to ~1000 bases has been achieved at room temperatures. It is noted that at higher operating temperatures (>50° C.), shorter running times with comparable resolutions can be achieved.

Example 3

Polymerization of PDMA in LPA to Produce Quasi-IPN (a) Sample Preparation:

LPA was polymerized from purified monomer acrylamide by using the inverse microemulsion polymerization method. The quasi-IPN was made by radical polymerization of dimethylacrylamide monomers in a LPA main frame.

(b) Solution Preparation for Laser Light Scattering.

Two stock solutions with concentrations of $7.77 \times 10^{-2}$ g/ml and $1.20 \times 10^{-2}$ g/ml in 1×TTE buffer solution for LPA and quasi-IPN, respectively, were prepared. The stock solution was kept in a 50-ml volumetric flask, which was shaken on a slow swing mixer for at least 7 to 10 days to make a uniform solution. Six solutions of LPA and five solutions of quasi-IPN with designated concentrations for light scattering measurements were prepared by diluting from the stock solution. Centrifugation (for 6 h at 7700 g (~8000 rpm)) was used for clarification of each diluted solution. The upper dust-free solution was used for light scattering characterization.

(c) Light Scattering Measurements:

A laboratory-built laser light scattering spectrometer was used to perform static and dynamic light scattering measurements at scattering angles between 15° to 1390 and at a temperature of 25° C. The laser output power at 532 nm wavelength was ~500 mW. The intensity-intensity autocorrelation function was determined at scattering angle 30°, 35°, 40°, 50°, 60° 70° and 90° with a Brookhaven Instruments B19000 digital correlator.

Figure 1:
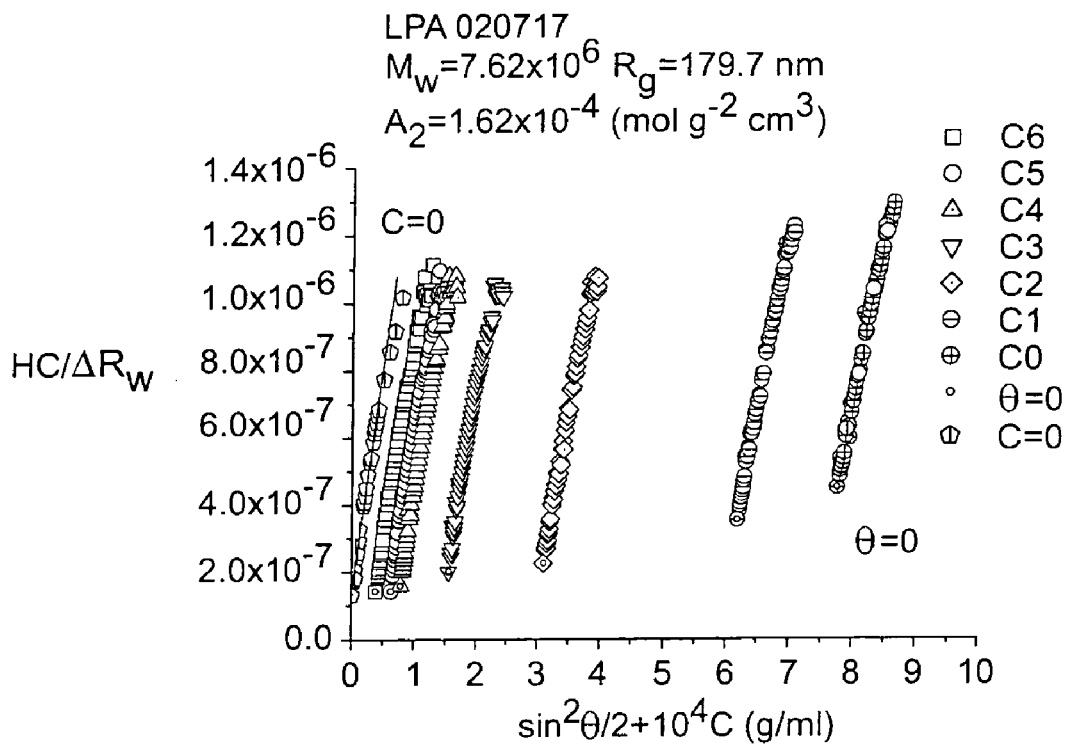
FIG. 1 is a Zimm plot of sample LPA in 1×TTE buffer solution. The plot shows static light scattering measurements of the LPA at scattering angles of 15° to 139° and a temperature of 25° C.
Figure 2:
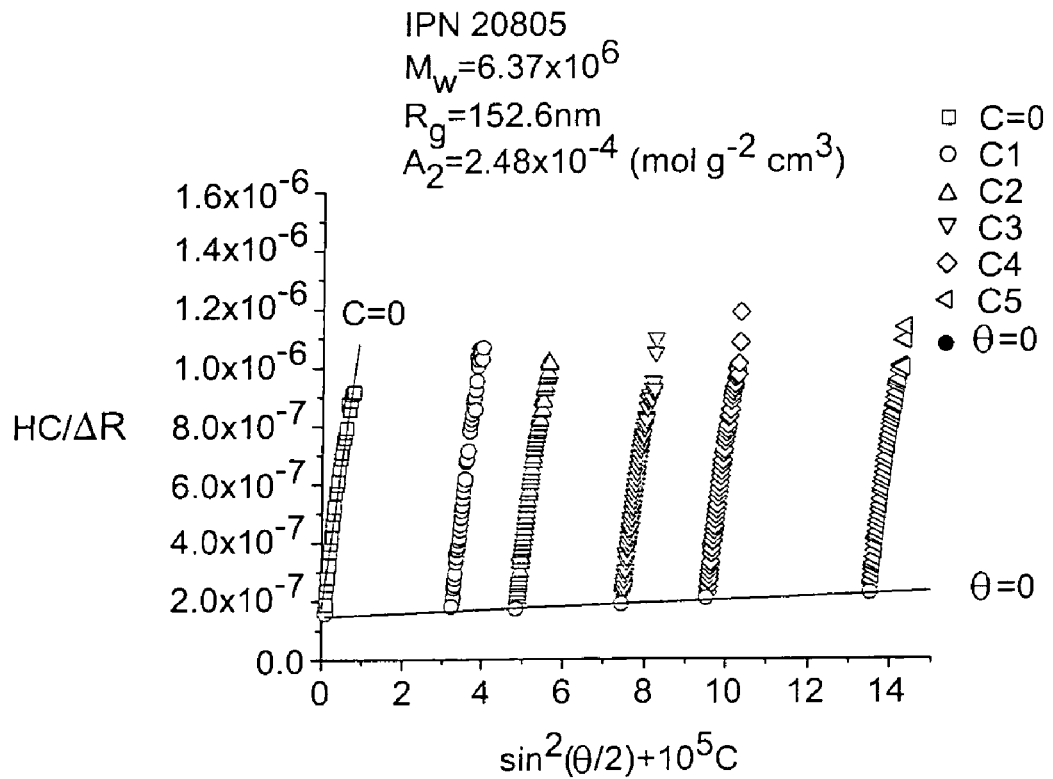
FIG. 2 is a Zimm plot of sample quasi-IPN in 1×TTE buffer solution. The plot shows static light scattering measurements of the quasi-IPN comprising LPA and PDMA at scattering angles of 15° to 139° and a temperature of 25° C.
Figure 3:
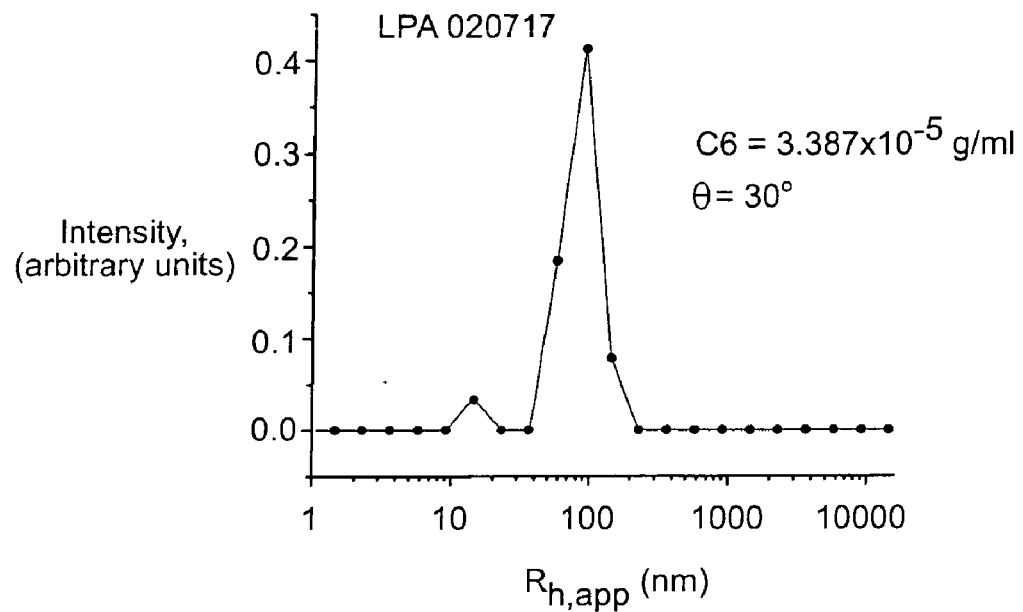
FIG. 3 shows the apparent hydrodynamic radius distribution of sample LPA obtained from dynamic light scattering measurements at a scattering angle of 30°, a temperature of 25° C., and C=$3.387 \times 10^{-5}$ g/ml.
Figure 4:
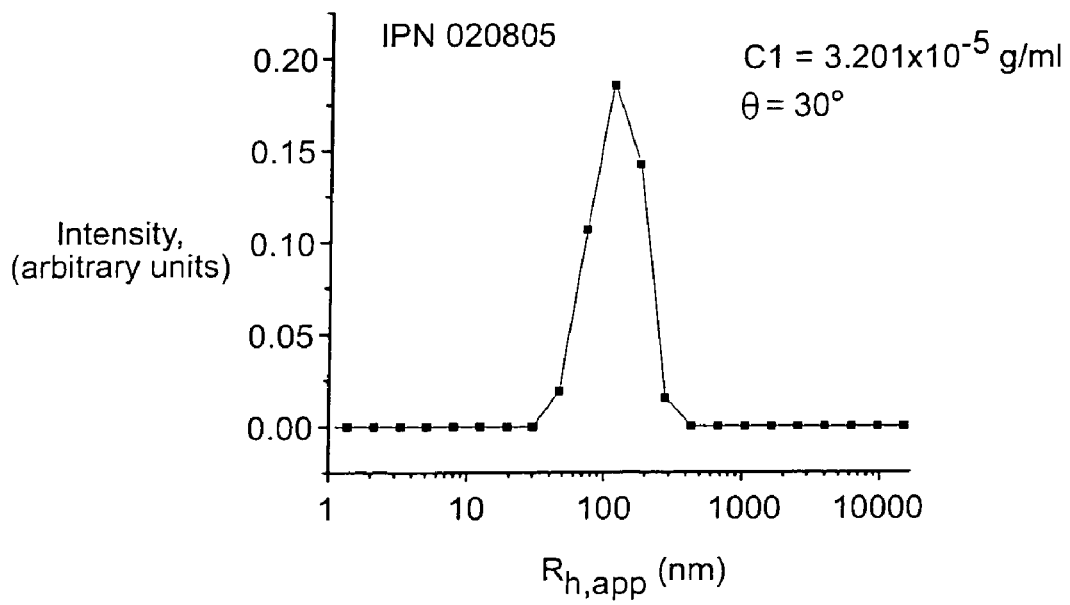
FIG. 4 shows the apparent hydrodynamic radius distribution of sample quasi-IPN obtained from dynamic light scattering measurements at a scattering angle of 30°, a temperature of 25° C., and C=$3.201 \times 10^{-5}$ g/ml.

Static light scattering results of LPA and quasi-IPN are shown in FIGS. 1 and 2, respectively. The dynamic light scattering results of LPA and quasi-IPN are shown in FIGS. 3 and 4, respectively. FIG. 3 presents two peaks, with one being a tiny peak at $R_h$ ~15 nm and the other main peak at $R_h$ ~80 nm. The tiny small size component could be removed in the clarification process for quasi-IPN. However, its presence could be an indication of the polymerization process of LPA, in which two separate steps of molecular chain growth could be involved. The smaller size molecular chains were formed in the beginning step and subsequently larger size molecular chains were formed.

(d) Capillary Electrophoresis

Preparation of Quasi-IPN Separation Medium:

In a 5 ml vial, dry quasi-IPN was dissolved in 1×TTE+7M Urea buffer solution. The total solution volume was usually less than 2 ml and the polymer concentration was around 2–2.5% g/ml. After the dry sample was swollen to a gel-like solution by standing overnight, the gel-like solution was mixed thoroughly on a vortex mixer for 20 s, twice a day until the polymer was totally dissolved. It took at least 3–4 days to prepare a uniform solution. The (polymer solution) separation medium should be centrifuged for removal of air bubbles before use.

(e) CE Electrophoresis:

Three different instruments used for CE measurements:

(i) A laboratory-built Laser-induced fluorescence detector with a water-cooled Ar-ion laser, λ=488 nm, was used for DNA sequencing analysis of single dye [FAM] labeled primer and the C-termination mix DNA [pGEM-3Zf(+) from the −21M13 forward primer].

Figure 5A:
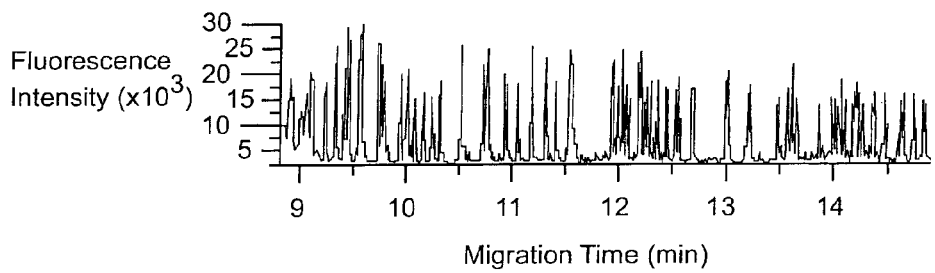
FIG. 5 shows the separation of DNA [pGEM-3Zf(+) from the-21M13 forward Primer] by CE in IPN/1×TTE+7M Urea buffer solution, C=2.0% g/ml at 60° C. Capillary effective length is 34 cm, ID/OD=75/365 (μm). Separation was performed in a laboratory-built instrument.
Figure 5B:
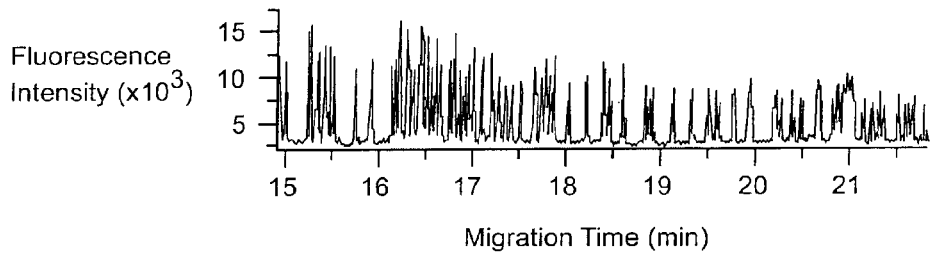
Figure 5C:
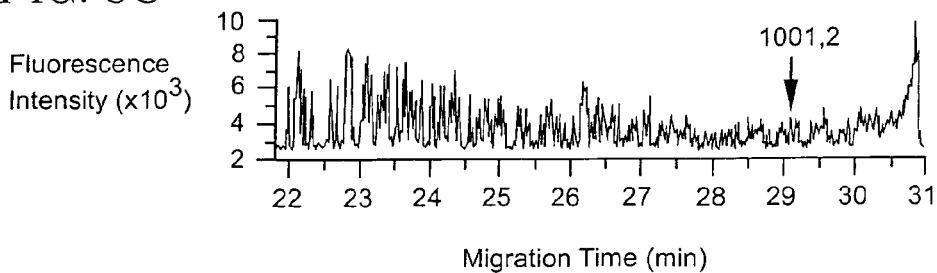

In FIG. 5, the sequencing analysis data shows that the separation of one thousand bases with one-base resolution (by eye only) could be completed within 30 min.

Comparison of Quasi-IPN with Different Commercial Products of Polymer Medium used for Separation of DNA.

Figure 6A:
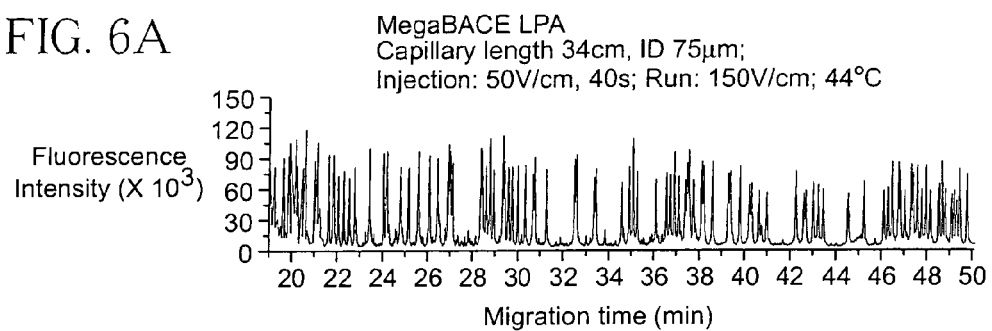
FIG. 6 shows the separation of DNA [pGEM-3Zf(+) from the-21M13 forward Primer] by CE in MegaBACE LPA/1×
Figure 6B:
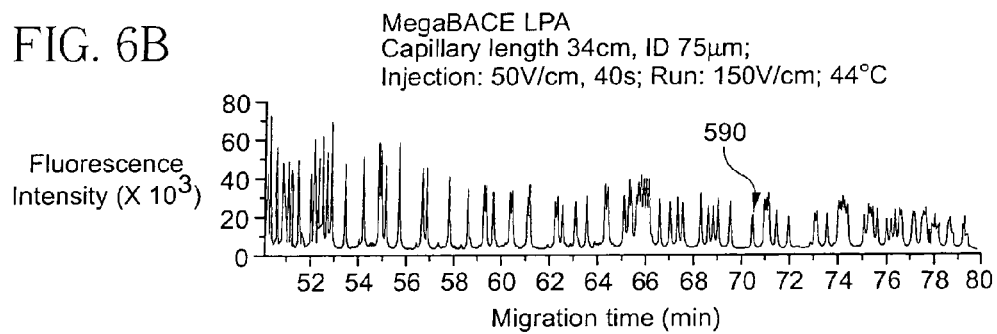
Figure 6C:
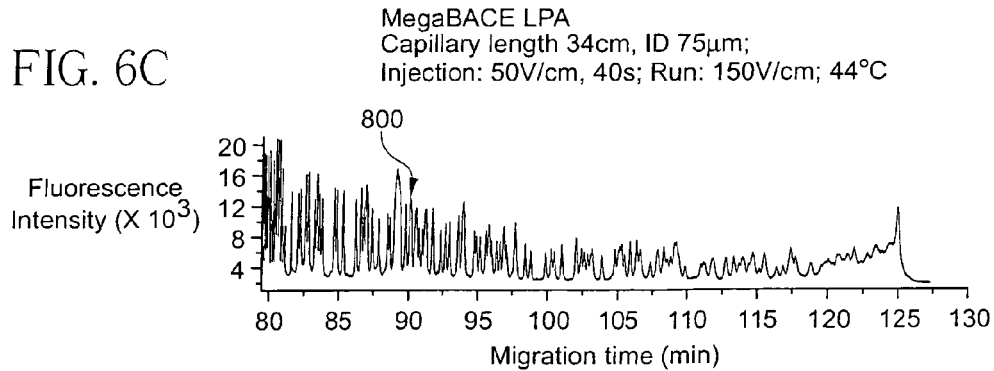

The sequencing analysis data of DNA [pGEM-3Zf(+) from the −21M13 forward Primer] is shown in FIG. 6. CE was run in MegaBACE LPA gel/1× MegaBACE buffer at 44° C. and 150 V/cm, which were recommended by Amersham Biosciences. FIG. 7 shows the sequencing analysis data of the same DNA, but CE was run in medium POP-6 (Applied Biosystems)/1×TTE buffer at 50° C. and 200V/cm, that were the CE routine running condition of POP6.

As a comparison, the migration time of 800 b of DNA sample could be used as a speed criterion of separation, it was completed within 26.3 min ($t_{800,IPN}$) by using quasi-IPN as a separation medium (FIG. 5), and was completed within 89 min ($t_{800,LPA}$) by using MegaBACE LPA gel as a separation medium (FIG. 6).

The separation speed of DNA in quasi-IPN medium was around three times faster than that of DNA in MegaBACE LPA gel. The DNA separation in POP6 medium could not reach 800 b (FIG. 7). If the migration time of 590 b could be taken as a speed criterion of DNA separation, then $t_{590,IPN}$=~22 min, $t_{590,LPA}$=~70.5 min and $t_{590,POP6}$=~89 min by using quasi-IPN, MegaBACE LPA and POP6 as a separation medium, respectively. The time needed for separation of DNA 590 bp in quasi-IPN could be only one-third times of that needed in MegaBACE LPA and one-fourth times of that needed in POP6.

ABI 310 genetic Analyzer is an automated single-capillary genetic analyzer designed and optimized to support a wide range of sequencing and fragment analysis application. BigDye Terminator v3.0 standard DNA was used to demonstrate the sequencing analysis performance.

FIG. 8 shows the last parts (base number from 600 to ~1000) of electrophoretic separations of BigDye v3.0. One thousand bases of four color BigDye v3.0 DNA were separated within 36 min by using the characterized quasi-IPN medium in ABI 310.

FIG. 9 shows the blue-G part of electrophoretic separation of BigDye v3.0 by using POP6 medium and Module seq POP6 (1 mL) E. The migration time of 860b ($t_{860,POP6}$) is ~61.5 min, which is 1.9 times longer than the migration time of 860b ($t_{860,IPN}$) ~32 min by using quasi-IPN separation medium (FIG. 8). The MagBACE LPA gel could not be used for ABI310, because of it has high viscosity and the pump pressure of ABI310 is not high enough to work on it.

Long base-call (1007b) could be read by eye from electrophoretic separation data, when quasi-IPN was used as a separation medium (FIG. 8), and only 860 b could be read by eye, when POP6 was used as a separation medium (FIG. 9).

A laboratory-built Laser-induced fluorescence (four colors) with silicon avalanche photodiode detector (Perkin Elmer Model SPCM-AQR-12-FC), which was built by Engineering College of SUNY at Stony Brook, was used for sequence analysis of BigDye Terminator v3.0. As a comparison, CE was run in different mediums of quasi-IPN and a new product of Applied Biosystems POP7.

In FIG. 10, the base calling data of DNA (BigDye Terminator v3.0) shows that the separation of 600 bases with one-base resolution could be completed within ~30.4 min ($t_{600,IPN}$), when CE was run in quasi-IPN/1×ABI buffer solution at 60° C. and 304 V/cm. Capillary effective length was 50 cm and capillary ID/OD=50/361 (μm). However, when POP7/1×ABI buffer solution was used as a separation medium, the best results of 600 bases of the same DNA was achieved within ~63.3 min ($t_{600,POP7}$) at 60° C. and 196 V/cm. Capillary effective length and ratio of ID/OD were the same at 50 cm and 50/361 (μm), respectively. The base-calling data is shown in FIG. 11. The separation time needed for separation of DNA 600 b with one-base resolution in quasi-IPN medium was half times shorter than that in POP7. (Instrument and base calling software were obtained from the Engineering College of SUNY at Stony Brook.)

Example 4

A Solution Mixing Method to Produce Quasi-IPN

Dilute solutions for the two different polymers were prepared separately. The two polymer solutions were gradually mixed together to form a uniform solution mixture with designated concentration and composition of the polymer components.

LPA and PDMA is a partially compatible polymer pair. To prepare a separation medium for CE measurements, a uniform LPA and PDMA solution mixture was made by using the solution-mixing method. LPA/buffer and PDMA/buffer solutions were prepared separately. LPA ($M_w = 7.62 \times 10^6$ g/mole) was dissolved in 1×TTE+7M Urea buffer to make a 2.57% g/ml solution. PDMA ($M_w = 470K$ g/mole) was dissolved in 1×TTE+7M Urea buffer to make a 1.61% g/ml solution. After each polymer was truly dissolved in its own buffer, 300 μl PDMA solution was gradually added into 0.9 ml LPA solution by 100 μl aliquots. After each addition of the PDMA solution, the solution mixture was mixed on a vortex mixer for 20 s. The content of LPA and PDMA in the solution mixture is 83% and 17%, respectively. It should be noted that at 470 K molecular weight of PDMA, 1.61% g/ml concentrated is already above its C* value.

FIG. 12 shows the CE results by using the LPA/PDMA quasi-IPN, prepared according to this Example 3, as a separation medium. As a comparison, FIG. 13 shows the results of CE by using the quasi-IPN, prepared according to Example 2, as a separation medium. The DNA separation results of both separation media are very similar under the same running conditions. Electrophoresis was conducted at a running field of 195.5 V/cm, with the DNA injection time being 20 s at 27 V/cm.

Example 5

A Solution Mixing Method to Produce Quasi-IPN

Starting materials include LPA with a molecular weight of about 7M; and PDMA with a molecular weight of about 0.5 M. A mixed solution having a final overall concentration of 2~2.5-wt % (0.02~0.025 g/ml) is prepared by several different methods as shown below.

A.) A solution with a concentration ratio in wt % of LPA/PDMA=1.6/1 is prepared. The concentration of the LPA solution is 0.0257 g/ml. The concentration of PDMA solution is 0.016 g/ml. A mixed solution having a final overall concentration of 2–2.5 wt % can be mixed in a variety of ways as follows.

| Composition Ratio in wt % of LPA/PDMA of the final solution | Volume Ratio of LPA/PDMA solution before Mixing | Total Volume After Mixing * |
|---|---|---|
| 2/1 | 1.2/1 | 2.2 units |
| 6/1 | 3.5/1 | 4.5 units |
| 10/1 | 6.5/1 | 7.5 units |

* Assume no change in volume and in units of volume.

B.) A solution with a concentration ratio in wt % of LPA/PDMA=2/1 is prepared. The concentration of the LPA solution is 0.028 g/ml. The concentration of PDMA solution is 0.014 g/ml. A mixed solution having a final overall concentration of 2–2.5 wt % can be mixed in a variety of ways as follows.

| Composition Ratio in wt % of LPA/PDMA of the final solution | Volume Ratio of LPA/PDMA solution before Mixing | Total Volume After Mixing * |
|---|---|---|
| 2/1 | 1/1 | 2 units |
| 6/1 | 2.8/1 | 3.8 units |
| 10/1 | 5/1 | 6.0 units |

* Assume no change in volume and in units of volume.

We claim:

1. A quasi-interpenetrating network of polymer chains, the chains comprising:
   (a) linear polyacrylamide (LPA) chains in the form of a main frame
   wherein the lower boundary of the range of the weight average molecular weight is approximately 0.05 million g/mole, and wherein the upper boundary of the range of the weight average molecular weight is approximately 25 million g/mole,
   and wherein the lower boundary of the range of the radius of gyration is approximately 10 nm, and wherein the upper boundary of the range of the radius of gyration is approximately 350 nm; and
   (b) polydimethylacrylamide (PDMA) chains prepared by polymerizing PDMA in the presence of the LPA main frame,
   wherein the LPA and PDMA chains are entangled within one another and interpenetrate one another, and wherein the quasi-interpenetrating network has substantially no chemical cross-linking.

2. The network of claim 1 wherein the LPA main frame is formed by inverse microemulsion polymerization.

3. The network of claim 1 wherein the PDMA is polymerized by radical polymerization in the LPA main frame.

4. The network of claim 1 wherein the LPA main frame comprises LPA in a buffer solution, wherein the lower boundary of the range of the overlap concentration of LPA is approximately $5 \times 10^{-4}$ g/ml, and wherein the upper boundary of the range of the overlap concentration of LPA is approximately $4.0 \times 10^{-2}$ g/ml.

5. The network of claim 1 wherein the LPA main frame has an overlap concentration of approximately $1.2 \times 10^{-3}$ g/ml in a buffer solution.

6. The network of claim 1 wherein the range of the weight-average molecular weight of the LPA is approximately 0.1 million g/mole to 15 million g/mole.

7. The network of claim 1 wherein the range of the weight-average molecular weight of the LPA is approximately 4 million g/mole to 8 million g/mole.

8. The network of claim 1 wherein the range of the radius of gyration of the LPA is approximately 15 nm to 250 nm.

9. The network of claim 1 wherein the range of the radius of gyration of the LPA is approximately 55 nm to 180 nm.

10. The network of claim 1 wherein the LPA has a polydispersity index of from about 1.01 to 1.8.

11. The network of claim 10 wherein the range of the polydispersity index of the LPA is approximately 1.02 to 1.6.

12. The network of claim 10 wherein the range of the polydispersity index of the LPA is approximately 1.1 to 1.3.

13. A quasi-interpenetrating network of entangled polymer chains, the chains comprising:
(a) linear polyacrylamide (LPA) chains; and
(b) polydimethylacrylamide (PDMA) chains entangled in the LPA chains and interpenetrating the LPA chains, wherein the lower boundary of the range of the weight-average molecular weight of LPA and the PDMA is approximately 0.1 million g/mole, and wherein the upper boundary of the range of the weight average molecular weight of LPA and the PDMA is approximately 20 million g/mole,
and wherein the lower boundary of the range of the radii of gyration of LPA and the PDMA are approximately 15 nm, and wherein the upper boundary of the range of the radii of gyration of LPA and the PDMA are approximately 320 nm, wherein the quasi-interpenetrating network has substantially no chemical cross-linking.

14. The network of claim 13 wherein the range of the weight-average molecular weight is approximately 0.5 million g/mole to 10 million g/mole.

15. The network of claim 13 wherein the range of the weight-average molecular weight is approximately 6 million g/mole to 7 million g/mole.

16. The network of claim 13 wherein the range of the radii of gyration is approximately 40 nm to 280 nm.

17. The network of claim 13 wherein the range of the radii of gyration is approximately 150 nm to 165 nm.

18. The network of claim 13 wherein the LPA and the PDMA each has a polydispersity index of from about 1.0 to 1.8.

19. The network of claim 13 wherein the LPA and the PDMA each have a polydispersity index of about 1.6.

20. The network of claim 13 wherein the lower boundary of the range of the overlap concentration of the network is approximately $5.0 \times 10^{-4}$ g/ml in a buffer solution, and wherein the upper boundary of the range of the overlap concentration of the network is approximately $3.0 \times 10^{-2}$ g/ml in a buffer solution.

21. The network of claim 13 wherein the ratio of the amount of LPA to the amount of PDMA is in the range of approximately 10:1 to 15:1 wherein the weight molecular weight range of the LPA is approximately from 6 million to 7 million g/mole.

22. A quasi-interpenetrating network of entangled polymer chains produced by a method comprising:
(a) providing a solution comprising linear polyacrylamide (LPA) and a buffer, wherein the lower boundary of the range of the weight average molecular weight of LPA is approximately 0.05 million g/mole, and wherein the upper boundary of the range of the weight average molecular weight of LPA is approximately 25 million g/mole;
(b) providing a solution comprising polydimethylacrylamide (PDMA) and a buffer, wherein the lower boundary of the range of the weight average molecular weight of PDMA is approximately 100,000 g/mole, and wherein the upper boundary of the range of the weight average molecular weight of PDMA is approximately 25 million g/mole;
(c) mixing the LPA/buffer solution and PDMA/buffer solution in a stepwise fashion, wherein the LPA/buffer solution is one to fifteen times as concentrated as the PDMA/buffer solution, and the volume of the LPA/buffer solution is about one to fifty times the volume of the PDMA solution;
wherein a quasi-interpenetrating network of entangled, interpenetrating LPA and PDMA polymer chains is produced, where the quasi-interpenetrating network has substantially no chemical cross-linking.

23. The quasi-interpenetrating network of claim 22 wherein the weight average molecular weight of the LPA is approximately 0.1 to 10 million g/mole.

24. The quasi-interpenetrating network of claim 22 wherein the weight average molecular weight of the LPA is approximately 1 to 4 million g/mole.

25. The quasi-interpenetrating network of claim 22 wherein the range of the weight average molecular weight of the PDMA is approximately 300,000 to 10 million g/mole.

26. The quasi-interpenetrating network of claim 22 wherein the weight average molecular weight of the PDMA is approximately 500,000 to 10 million g/mole.

27. The quasi-interpenetrating network of claim 22 wherein the LAP/buffer solution has a concentration of approximately 1.0 to 12.0% g/ml.

28. The quasi-interpenetrating network of claim 22 wherein the PDMA/buffer solution has a concentration of approximately 0.1 to 3.0% g/ml.

29. In a method of separating charged molecular species, the method comprising causing a charged molecular species to migrate in a separation medium by the influence of an applied electric field, the improvement wherein the separation medium comprises an LPA polymer system and a PMDA polymer system wherein the polymer systems form a quasi-interpenetrating network.

30. The method according to claim 29 wherein the interpenetrating network is prepared by synthesizing an LPA main frame, and polymerizing a PDMA within the main frame.

31. The method according to claim 29 wherein the interpenetrating network is prepared by:
(a) providing a solution comprising LPA and a buffer, wherein the upper boundary of the range of the weigh average molecular weight of LPA is approximately 0.05 million g/mole, and wherein the upper boundary of the range of the weight average molecular weight of LPA is approximately 25 million g/mole;
(b) providing a solution comprising PDMA and a buffer, wherein the upper boundary of the range of the weight average molecular weight of PDMA is approximately 100,000 g/mole, and wherein the upper boundary of the range of the weight average molecular weight of PDMA is approximately 25 million g/mole; and
(c) mixing the LAP/buffer solution and PDMA/buffer solution in a stepwise fashion, wherein the LAP/buffer solution is one to fifteen times as concentrated as the PDMA/buffer solution, and the volume of the LAP/buffer solution is about one to fifty times the volume of the PDMA solution.

32. A quasi-interpenetrating network of polymer chains, the chains comprising:
(a) acrylamide (AM)/dimethylacrylamide (DMA) random copolymer chains in the form of a main frame
wherein the lower boundary of the range of the weight average molecular weight is approximately 0.05 million g/mole, and wherein the upper boundary of the range of the weight average molecular weight is approximately 2 million g/mole,
and wherein the lower boundary of the range of the radius of gyration is approximately 10 nm, and wherein the upper boundary of the range of the radius of gyration is approximately 80 nm; and
(b) polydimethylacrylamide (PDMA) chains prepared by polymerizing PDMA in the presence of the random copolymer main frame;

wherein the AM/DMA and PDMA chains are entangled within one another, and interpenetrate one another, and wherein the quasi-interpenetrating network has substantially no chemical cross-linking.

33. The network of claim 32 wherein the random copolymer main frame is formed by radical polymerization.

34. The network of claim 32 wherein the PDMA is polymerized by radical polymerization in the random copolymer main frame.

35. The network of claim 32 wherein the random copolymer main frame comprises copolymers in a buffer solution, wherein the lower boundary of the range of the overlap concentration of random copolymer is approximately $3 \times 10^{-3}$ g/ml, and wherein the upper boundary of the range of the overlap concentration of random copolymer is approximately $4.0 \times 10^{-2}$ g/ml.

36. The network of claim 32 wherein the copolymer main frame has an overlap concentration of approximately $1 \times 10^{-2}$ g/ml in a buffer solution.

37. The network of claim 32 wherein the weight-average molecular weight range of the random copolymer is approximately 0.1 million to 1 million g/mole.

38. The network of claim 32 wherein the weight-average molecular weight range of the random copolymer is approximately 0.3 million to 0.5 million g/mole.

39. The network of claim 32 wherein the range of the radius of gyration of the copolymer is approximately 15 nm to 55 nm.

40. The network of claim 32 wherein the range of the radius of gyration of the copolymer is approximately 30 nm to 40 nm.

41. The network of claim 32 wherein the random copolymer has a polydispersity index of from about 1.1 to 2.0.

42. The network of claim 32 wherein the ratio of the amount of AM to the amount of DMA is in the range of approximately 5:1 to 50:1 wherein the weight molecular weight range of the random copolymer is approximately from 0.05 million to 2 million g/mole.

43. A quasi-interpenetrating network of entangled polymer chains produced by a method comprising:
   (a) providing a solution comprising AM/DMA random copolymer and a buffer, wherein the lower boundary of the range of the weight average molecular weight of AM/DMA random copolymer is approximately 0.05 million g/mole, and wherein the upper boundary of the range of the weight average molecular weight is approximately 2 million g/mole;
   (b) providing a solution comprising polydimethylacrylamide (PDMA) and a buffer, wherein the lower boundary of the range of the weight average molecular weight of PDMA is approximately 0.05 million g/mole, and wherein the upper boundary of the range of the weight average molecular weight is 25 million g/mole;
   (c) mixing the copolymer/buffer solution and PDMA/buffer solution in a stepwise fashion, wherein the copolymer/buffer solution is one to fifty times as concentrated as the PDMA/buffer solution, and the volume of the copolymer/buffer solution is about one to twenty times the volume of the PDMA solution;
wherein a quasi-interpenetrating network of entangled copolymer and PDMA polymer chains is produced, wherein the quasi-IPN has substantially no chemical cross-linking.

44. The quasi-interpenetrating network of claim 43 wherein the range of the weight average molecular weight of the copolymer is approximately 0.1 to 1.5 million g/mole.

45. The quasi-interpenetrating network of claim 43 wherein the range of the weight average molecular weight of the copolymer is approximately 0.3 to 1 million g/mole.

46. The quasi-interpenetrating network of claim 43 wherein the range of the weight average molecular weight of the PDMA is approximately 100,000 to 10 million g/mole.

47. The quasi-interpenetrating network of claim 43 wherein the upper boundary of the range of the weight average molecular weight of the PDMA is approximately 200,00 to 500,000 g/mole.

48. The quasi-interpenetrating network of claim 43 wherein the copolymer/buffer solution has a concentration of approximately 5.0 to 20.0% g/ml.

49. The quasi-interpenetrating network of claim 43 wherein the PDMA/buffer solution has a concentration of approximately 0.1 to 1.0% g/ml.

50. In a method of separating charged molecular species, the method comprising causing a charged molecular species to migrate in a separation medium by the influence of an applied electric field, the improvement wherein the separation medium comprises an AM/DMA random copolymer and a PMDA polymer wherein the polymer systems form a quasi-interpenetrating network.

51. The method according to claim 50 wherein the interpenetrating network is prepared by synthesizing an AM/DMA random copolymer main frame, and polymerizing a PDMA within the main frame.

52. The method according to claim 50 wherein the interpenetrating network is prepared by:
   (a) providing a solution comprising AM/DMA random copolymer and a buffer, wherein the lower boundary of the range of the weight average molecular weight of AM/DMA random copolymer is approximately 0.05 million g/mole, and wherein the upper boundary of the range of the weight average molecular weight is approximately 2 million g/mole;
   (b) providing a solution comprising PDMA and a buffer, wherein the lower boundary of the range of the weight average molecular weight of PDMA is approximately 50,000, and wherein the upper boundary of the range of the weight average molecular weight is approximately 25 million g/mole; and
   (c) mixing the copolymer/buffer solution and PDMA/buffer solution in a stepwise fashion, wherein the copolymer/buffer solution is one to fifty times as concentrated as the PDMA/buffer solution, and the volume of the copolymer/buffer solution is about one to twenty times the volume of the PDMA solution;
wherein a quasi-interpenetrating network of entangled copolymer and PDMA polymer chains is produced, wherein the quasi-interpenetrating network has substantially no chemical cross-linking.

* * * * *